US010390089B2

(12) United States Patent
Jeon et al.

(10) Patent No.: US 10,390,089 B2
(45) Date of Patent: Aug. 20, 2019

(54) INTEGRAL PROGRAM CONTENT DISTRIBUTION

(71) Applicant: Google Inc., Mountain View, CA (US)

(72) Inventors: Joon-Hee Jeon, Palo Alto, CA (US); Yash Kumar, San Francisco, CA (US); Stephen Lau, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/373,608

(22) Filed: Dec. 9, 2016

(65) Prior Publication Data

US 2018/0167681 A1 Jun. 14, 2018

(51) Int. Cl.
| | |
|---|---|
| H04N 21/458 | (2011.01) |
| H04N 21/4147 | (2011.01) |
| H04N 21/433 | (2011.01) |
| H04N 21/434 | (2011.01) |
| H04N 21/439 | (2011.01) |
| H04N 21/482 | (2011.01) |
| H04N 21/488 | (2011.01) |

(Continued)

(52) U.S. Cl.
CPC ....... *H04N 21/4583* (2013.01); *H04N 21/274* (2013.01); *H04N 21/2747* (2013.01); *H04N 21/4147* (2013.01); *H04N 21/439* (2013.01); *H04N 21/4334* (2013.01); *H04N 21/4345* (2013.01); *H04N 21/4821* (2013.01); *H04N 21/4884* (2013.01)

(58) Field of Classification Search
CPC ............. H04N 21/4334; H04N 21/434; H04N 21/44008; H04N 21/4583; H04N 21/4828
See application file for complete search history.

(56) References Cited

U.S. PATENT DOCUMENTS

| 6,564,383 B1 * | 5/2003 | Combs | H04N 7/163 |
| | | | 348/465 |
| 6,771,885 B1 * | 8/2004 | Agnihotri | H04N 5/782 |
| | | | 386/314 |

(Continued)

FOREIGN PATENT DOCUMENTS

| EP | 2487611 | 8/2012 |
| EP | 2490443 | 8/2012 |

(Continued)

OTHER PUBLICATIONS

Levin,"Why Do Americans Have the Worst DVRs?", Retrieved at: http://www.slate.com/articles/arts/culturebox/2013/06/accurate_recording_the_one_amazing_feature_that_makes_european_dvrs_so_much.html, Jun. 21, 2013, 6 pages.

(Continued)

*Primary Examiner* — Pankaj Kumar
*Assistant Examiner* — Timothy R Newlin
(74) *Attorney, Agent, or Firm* — Colby Nipper PLLC

(57) ABSTRACT

This document describes techniques using, and devices embodying, integral program content distribution. These techniques and devices enable a request for program content to be received from an end-user device. In response to the request, an integral version of the requested program content is determined using an indication of a program content transition that corresponds to an apparent broadcast time of the requested program content. The program content can be transmitted to the end-user device as part of a cloud-based digital video recorder (DVR) system.

20 Claims, 15 Drawing Sheets

(51) Int. Cl.
*H04N 21/274* (2011.01)
*H04N 21/2747* (2011.01)

(56) References Cited

U.S. PATENT DOCUMENTS

| | | | | |
|---|---|---|---|---|
| 8,150,233 | B2* | 4/2012 | Takao | G11B 27/28 386/239 |
| 8,463,112 | B2* | 6/2013 | Ohki | G11B 27/105 386/343 |
| 8,635,639 | B1* | 1/2014 | Volovich | H04H 60/37 725/19 |
| 8,942,542 | B1* | 1/2015 | Sherrets | H04N 21/44008 386/241 |
| 9,578,379 | B1* | 2/2017 | Klappert | H04N 21/4756 |
| 9,723,254 | B2* | 8/2017 | Callaway | H04N 5/775 |
| 2002/0188947 | A1* | 12/2002 | Wang | H04N 5/44543 725/45 |
| 2003/0001977 | A1* | 1/2003 | Wang | H04N 5/76 348/700 |
| 2003/0093790 | A1* | 5/2003 | Logan | G06F 17/30265 725/38 |
| 2003/0208767 | A1 | 11/2003 | Williamson et al. | |
| 2004/0002969 | A1* | 1/2004 | Perng | H04N 5/76 |
| 2004/0078817 | A1* | 4/2004 | Horowitz | H04N 5/782 725/58 |
| 2005/0138674 | A1* | 6/2005 | Howard | H04N 7/088 725/136 |
| 2005/0155079 | A1 | 7/2005 | Chen et al. | |
| 2005/0216838 | A1* | 9/2005 | Graham | G06F 3/1206 715/713 |
| 2005/0228806 | A1 | 10/2005 | Haberman | |
| 2006/0252536 | A1* | 11/2006 | Shiu | G11B 27/28 463/36 |
| 2007/0058949 | A1* | 3/2007 | Hamzy | G11B 27/034 386/292 |
| 2007/0083883 | A1* | 4/2007 | Deng | G11B 27/28 725/19 |
| 2007/0092204 | A1* | 4/2007 | Wagner | H04N 5/782 386/241 |
| 2008/0178225 | A1 | 7/2008 | Jost | |
| 2009/0064253 | A1* | 3/2009 | Oh | H04N 21/235 725/115 |
| 2009/0204996 | A1* | 8/2009 | Kim | H04N 5/445 725/54 |
| 2009/0220216 | A1 | 9/2009 | Marsh et al. | |
| 2009/0295993 | A1* | 12/2009 | Chhokra | H04N 5/782 348/553 |
| 2010/0014835 | A1* | 1/2010 | Matsuyama | G11B 27/105 386/240 |
| 2010/0242079 | A1 | 9/2010 | Riedl et al. | |
| 2010/0306805 | A1* | 12/2010 | Neumeier | H04N 5/44591 725/60 |
| 2011/0087490 | A1* | 4/2011 | Olson | G10L 25/48 704/231 |
| 2011/0211812 | A1* | 9/2011 | Tzoukermann | H04N 7/17318 386/250 |
| 2011/0280551 | A1* | 11/2011 | Sammon | G11B 27/034 386/289 |
| 2011/0286719 | A1* | 11/2011 | Woods | H04N 5/76 386/293 |
| 2012/0124474 | A1* | 5/2012 | Suh | H04N 5/44591 715/717 |
| 2012/0183276 | A1* | 7/2012 | Quan | H04N 5/782 386/244 |
| 2014/0165116 | A1 | 6/2014 | Major et al. | |
| 2014/0201769 | A1* | 7/2014 | Neumeier | H04N 5/44591 725/14 |
| 2015/0003739 | A1* | 1/2015 | Cho | G06K 9/00718 382/195 |
| 2015/0135208 | A1* | 5/2015 | Itagaki | H04N 21/4363 725/25 |
| 2015/0163562 | A1* | 6/2015 | Leventhal | H04N 21/8126 725/116 |
| 2015/0229980 | A1* | 8/2015 | Reisner | H04N 21/26233 725/32 |
| 2015/0310894 | A1* | 10/2015 | Stieglitz | H04N 21/47217 386/241 |
| 2015/0312652 | A1* | 10/2015 | Baker | H04N 21/8549 386/281 |
| 2016/0014458 | A1* | 1/2016 | Robinson | G11B 27/005 386/241 |
| 2016/0110877 | A1* | 4/2016 | Schwartz | G06F 17/30038 382/107 |
| 2016/0227281 | A1 | 8/2016 | Abuelsaad et al. | |
| 2016/0234546 | A1 | 8/2016 | Carlucci et al. | |
| 2017/0164060 | A1* | 6/2017 | Blong | H04N 21/4826 |

FOREIGN PATENT DOCUMENTS

| | | |
|---|---|---|
| EP | 3048801 | 7/2016 |
| WO | 2018106314 | 6/2018 |

OTHER PUBLICATIONS

Lopez, "Gracenote's Data Guides DVRs to Be Overtime Game Proof", Retrieved at: http://www.sporttechie.com/2015/10/05/technology/gracenotes-data-guides-dvrs-overtime-game-proof/, Oct. 5, 2015, 4 pages.

"International Search Report and Written Opinion", PCT Application No. PCT/US2017/053322, dated Jan. 5, 2018, 12 pages.

"Written Opinion", PCT Application No. PCT/US2017/053322, dated Oct. 25, 2015, 7 pages.

"International Preliminary Report on Patentability", PCT Application No. PCT/US2017/053322, dated Jun. 20, 2019, 9 pages.

* cited by examiner

INTEGRAL PROGRAM CONTENT DISTRIBUTION

BACKGROUND

Mainstream television broadcasting began in the 1940s and blossomed in the 1950s. From this era into the 1970s, watching television required being in front of the television at the appointed time when a given television show was being broadcast. There was no mechanism for consumers to record a television show for subsequent viewing. In the 1970s, however, video cassette recorders (VCRs) became affordable. Consumers were empowered to record shows onto video cassette tapes with VCRs. The viewing of television shows could therefore be shifted to a more convenient time.

However, using VCR-based technology to time shift the watching of television shows presented a number of issues. First, programming a VCR to correctly record a desired television show by setting a starting time and an ending time was difficult because the user interface for VCRs was clunky and confusing. Many desired shows were not recorded. Second, VCRs recorded television shows on separate, removable video cassette tapes. Video cassette tapes employed an analog recording tape that was subject to deterioration after just a few uses and eventually wore out completely. The consumer also had to manage a library of recording tapes by ensuring that a fresh tape with no meaningful content was inserted and rewound before leaving the VCR to hopefully record a desired television show. Further, video cassette tapes offered only a relatively few fixed recording lengths. Recording length had to be two, four, or six hours. However, with each increase in recording length, the quality of the resulting recording decreased significantly. Consumers therefore had to choose between shorter recordings with acceptable visual quality or longer recordings with poor or almost unwatchable visual quality.

Many of these problems were addressed with the introduction of local digital video recorders (DVRs). DVRs can record a high quality digital version of a television show to a digital recording medium, such as a magnetic disk, which can be reused numerous times with no decrease in recording quality. Further, the digital recording medium for local DVRs is internal to the DVR device. Although this internal recording medium sets an ultimate upper limit on the available recording time for each local DVR device, DVRs have rendered obsolete the storage and manipulation of a library of recordable video cassettes. With regard to programming ease, the user interface for DVRs is also a substantial improvement over that of VCRs.

Unfortunately, recording television shows with DVRs still presents a number of problems. First, recording is permitted by the DVR user interface in blocks of time that are dictated by the expected length of a television show, such as the length of time between a scheduled broadcast start time and a scheduled broadcast end time. Second, a television show that extends beyond the expected length may not be recorded past the scheduled broadcast end time. Some DVRs do permit a consumer to set an extended recording time at the time the recording is requested. However, the extended recording time is offered in fixed increments, such as 30 minutes, 60 minutes, 90 minutes, and so forth. If the consumer sets a relatively shorter extended recording time, the consumer risks missing the end of the desired television show, especially when the television show is a sporting event that experiences a weather delay or multiple overtimes. If, on the other hand, the consumer sets a relatively longer extended recording time, the consumer is likely wasting a portion of the limited number of recording hours available on the internal recording medium of a local DVR.

SUMMARY

This document describes techniques and devices for integral program content distribution. These techniques and devices enable an end user to request the recording of program content as part of a cloud-based digital video recorder (DVR) system, which can record received media content even when an apparent broadcast time differs from a scheduled broadcast time.

This summary is provided to introduce simplified concepts concerning integral program content distribution, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for integral program content distribution are described with reference to the following drawings. The same numbers are used throughout the drawings to reference like features and components.

DETAILED DESCRIPTION

Overview

Figure 1:
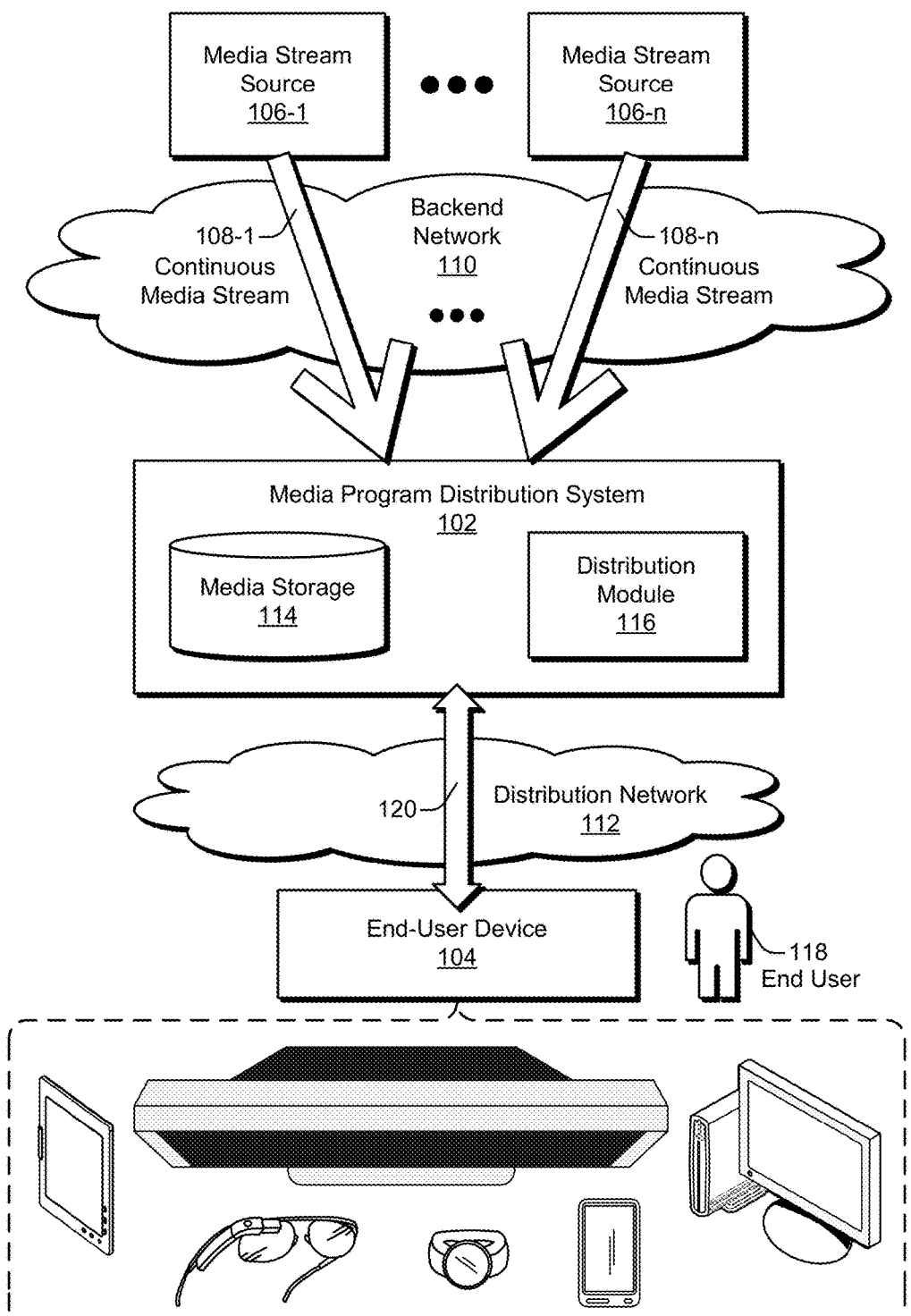
FIG. 1 illustrates an example environment in which integral program content distribution can be implemented.

The development of local digital video recorders (DVRs) for individual consumers brought a number of television-viewing enhancements as compared to the older video cassette recorders (VCRs). However, the total recording time of a local DVR is limited by the amount of local storage media included in a consumer's individual DVR. Consumers with local DVRs are therefore forced to choose between wasting the limited available recording time or potentially missing the conclusion of a television show that extends beyond a scheduled broadcast end time.

Cloud-based DVRs, on the other hand, can store an almost unlimited amount of media stream data that is received from different television networks. Nevertheless, end users of a cloud-based DVR system can schedule recordings of upcoming media programs, but the media program that is scheduled for recording can still extend beyond the scheduled broadcast end time. For example, a sporting event can be delayed by weather or can enter extra innings due to a game with a tied score. Also, a breaking news story can interrupt a show that is still continued in its entirety. Furthermore, with networks arranging commercial breaks so as to launch a succeeding program immediately upon the conclusion of a preceding program, previews for the following week's episode of the preceding program or even the final moments thereof can be lost to the recording if the network's clock diverges from that of the cloud-based DVR system.

One approach to addressing this loss of content when media programs extend beyond a scheduled broadcast end time is to merely continue streaming a channel's stored media stream to an end-user device until the end-user device sends an instruction to cease streaming. Such an instruction is sent from the end-user device responsive to an end user's command to terminate display of a streaming video. However, this is an inelegant strategy that relies on an end user to perform a function that most end users would expect to be handled automatically. Moreover, transmission bandwidth and processing resources are unnecessarily consumed from a time when the media program actually ends to a time when the end user commands the media stream to terminate. This ultimately costs both the consumer end user and the corporate provider of the cloud-based DVR service in terms of time, money, or energy. This approach also requires an end user to fast forward when an actual broadcast start time occurs after a scheduled broadcast start time due to a delay that occurred earlier in the day.

In contrast, techniques and devices for integral program content distribution focus on providing an end user an ability to record program content, even if the program content does not adhere to a scheduled broadcast time boundary. The program content can include a full media program that has an actual broadcast start time or an actual broadcast end time that differs from the scheduled broadcast start time or the scheduled broadcast end time, respectively, from EPG data. Alternatively, the program content can include an excerpt of a media program where the excerpt lacks a scheduled broadcast start time or a scheduled broadcast end time in the EPG data. Requested program content can be indicated using a name of a media program, selection of a media program via a displayed EPG, a name of a media personality, a name of a sporting event or athlete, some combination thereof, and so forth.

Implementations of integral program content distribution can use a variety of inputs to determine an apparent broadcast time. Examples of inputs include EPG data, content of a media program, or other content information sources. Examples of other content information sources include social media communications, webpages, entity images, content features, and words or phrases indicative of program content transitions. Generally, indications of program content transition from such content information sources can individually or jointly enable the determination of a temporal location of requested program content along a media stream, with the temporal location corresponding to at least one apparent broadcast time. An integral program content distribution system transmits the requested program content to an end-user device based on the apparent broadcast time—such as by initiating or terminating a program content transmission responsive to an apparent broadcast start time or an apparent broadcast end time, respectively.

Thus, this document describes techniques and devices enabling integral program content distribution. These techniques and devices enable an end user to receive an entirety of a requested program content in accordance with an end user's intent, even if a scheduled broadcast time for the program content is not aligned with an actual broadcast time. The techniques and devices are capable of providing program content that is coextensive with a media program or program content that occupies a part of, or is an excerpt of, a media program. Furthermore, with these techniques and devices, an end user is not obligated to manually fast-forward to reach requested program content or terminate a media stream after the requested program content has played.

This document now turns to an example environment, after which example integral program content distribution systems and operations, example techniques and devices for implementation of modules, example methods, and an example computing system are described.

Example Environment

FIG. 1 illustrates an example environment 100 in which integral program content distribution can be implemented. Example environment 100 represents a media environment in which video or other media can be distributed from content sources to consumers. As shown, example environment 100 includes a media program distribution system 102, an end-user device 104, and multiple media stream sources 106-1 to 106-n. Although shown from the perspective of a single end-user device 104, the media program distribution system 102 can service thousands, hundreds of thousands, or even millions of end-user devices 104 in a geographically distributed environment.

Example environment 100 further includes one or more networks, which are shown as backend network 110 and distribution network 112, and multiple continuous media streams 108-1 to 108-n. The media program distribution system 102 includes media storage 114 and a distribution module 116 and can be implemented using, for example, one or more server computing devices or distributed cloud-computing functionality. End-user device 104 is typically operated by an end user 118. Although not shown, the media program distribution system 102 is typically operated, controlled, or managed by an associated actor, such as a corporate owner or cable television operator.

Each respective media stream source 106 provides a respective continuous media stream 108. A media stream source 106 represents the hardware or media of a broadcast network, such as a traditional television network, a cable television network, or a premium television network. A media stream source 106 can also represent, for example, an over-the-top video distribution network or company. Broadcast television networks, as used herein, include any networks or channels in which media content is delivered to consumers in accordance with a schedule at specifically-indicated times or timeslots. Thus, broadcast networks can be contrasted with on-demand television networks or services in which a consumer can request individual media programs at any given time. Accordingly, a continuous media stream 108 includes a stream of media programs that are intended to be delivered in accordance with a predetermined schedule. Continuous media streams 108 and media program schedules are described below with reference to FIGS. 3-6.

The multiple media stream sources 106-1 to 106-n provide the multiple continuous media streams 108-1 to 108-n to media program distribution system 102 via backend network 110. Backend network 110 can include one or more networks or network types, such as a terrestrial network (e.g., having fiber optic links), a satellite network, or the internet. Media program distribution system 102 typically bundles the media content of multiple broadcast networks into groups of channels to which end user 118 can subscribe. Using distribution module 116 and media storage 114, media program distribution system 102 delivers content to end-user device 104 from a selected media stream source 106. Media storage 114 can be used to temporarily store the content of a continuous media stream 108 for various purposes such as buffering, synchronization, and the like. Alternatively, media storage 114 can store the content of the multiple continuous media streams 108-1 to 108-n for longer periods of time to act as a cloud-based DVR service for end user 118. A cloud-based DVR implementation is described below with reference to FIG. 2.

Media program distribution system 102 can provide individualized media program distribution 120 to end-user device 104 via distribution network 112. Distribution network 112 can include one or more networks or network types, such as wired networks, wireless networks, a fiber-optic network, a coaxial network, a cellular network, the internet, public networks, private networks, or combinations thereof. Although illustrated separately, backend network 110 and distribution network 112 can have an overlapping network topology or shared network resources. Based on end-user-specific requests or network package subscriptions, distribution module 116 provides to end user 118 access to multiple continuous media streams 108-1 to 108-n using end-user device 104. Examples of end-user devices 104 are shown to include a television, a tablet computing device, a desktop computer, intelligent glasses, a smartwatch, and a smart phone. Other implementations for an end-user device 104 can alternatively be realized, such as a notebook computer, an entertainment appliance, or a set top box (STB).

Example Systems and Arrangements

Figure 2:
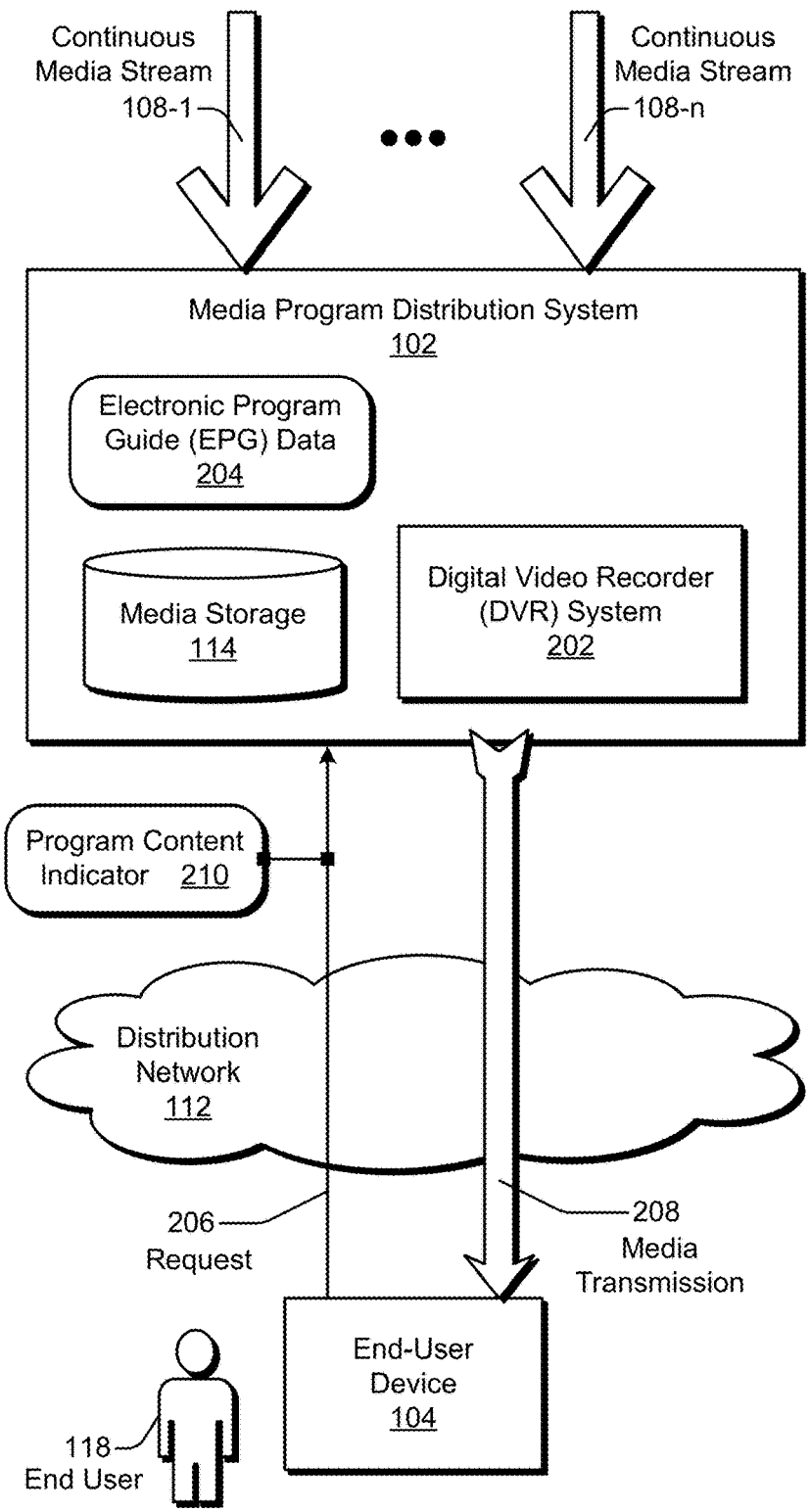
FIG. 2 illustrates an example media program distribution system having a cloud-based digital video recorder (DVR) system that interacts with an end-user device.

FIG. 2 illustrates an example media distribution arrangement 200 with media program distribution system 102 having a cloud-based DVR system 202 that interacts with end-user device 104. Media program distribution system 102 includes or otherwise has access to electronic program guide (EPG) data 204. EPG data 204 is described below with reference to FIG. 3 in the context of an EPG display. EPG data 204 indicates what media programs are scheduled to be delivered at which broadcast times on a per-channel basis for each media stream source 106 of FIG. 1. DVR system 202 can record media programs received as part of a continuous media stream 108 in accordance with EPG data 204 and based on a record request received from end-user device 104. At least part of DVR system 202 can be implemented using one or more modules as described herein below.

In operation, under the direction of end user 118, end-user device 104 generates a request 206 for program content. Request 206 includes a program content indicator 210 for the requested program content. Program content indicator 210 can include a title of a television series, an episode of series, or a movie. Or program content indicator 210 can include a code representative of a television series, a television episode, or a movie. Alternatively, program content indicator 210 can include an entered term representative of some entity, such as a person, an event, and the like. Persons include actors, actresses, directors, characters, athletes, politicians, or other public media personalities. Events include an athletic competition, a news story, a setting of a story, and so forth. Thus, examples of program content indicators 210 include a name of a show, a selection of a show via a displayed EPG, an entered name of a character or other media personality, a description of a topic, and so forth.

DVR system 202 receives request 206 having program content indicator 210 of the desired program content. Based on request 206, as well as EPG data 204 in some implementations, DVR system 202 records the desired program content for the benefit of end user 118. Responsive to a subsequent request from end-user device 104 to view recorded program content, DVR system 202 transmits the program content to end-user device 104 as indicated by media transmission 208. Media transmission 208 can be performed via a streaming of the requested program content. Alternatively, media transmission 208 can be performed via an atomic download of the requested program content for storage at end-user device 104 and subsequent viewing, including potentially offline viewing.

Figure 3:
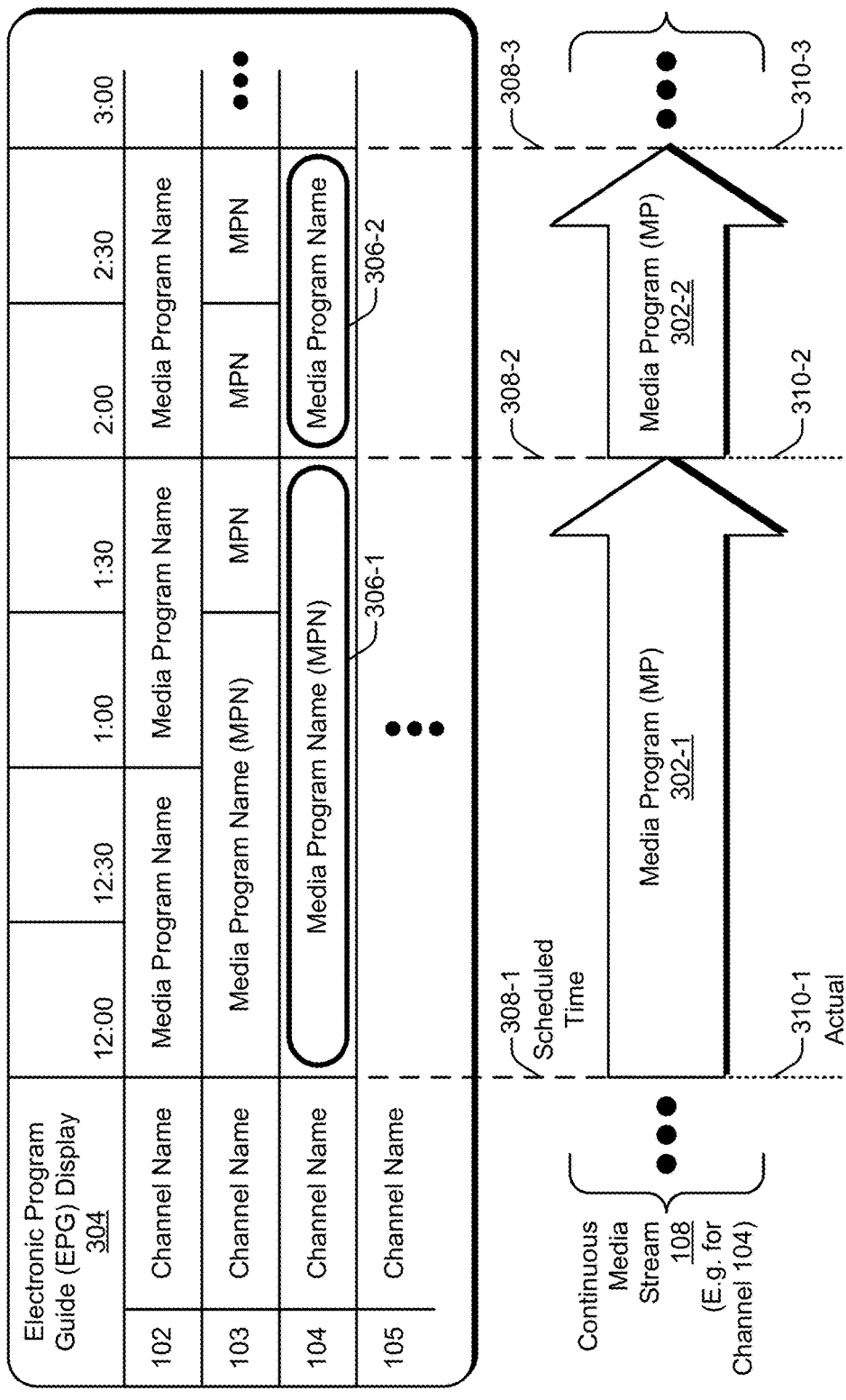
FIG. 3 illustrates an example electronic program guide (EPG) display in which media program delivery is aligned with scheduled broadcast times.

FIG. 3 illustrates generally at 300 an example EPG display 304 in which media program delivery is aligned with scheduled broadcast times 308. EPG display 304 is a person-friendly presentation of EPG data 204 of FIG. 2, which enables media programs to be organized by channel and timeslot. An end-user device 104 (e.g., of FIG. 2) can present EPG display 304 via an integrated or a separate screen. As illustrated, EPG display 304 includes a grid of media program information with channels in a vertical direction and timeslots in a horizontal direction. As shown by way of example, channels 102, 103, 104, 105, and so forth are shown in separate rows. Timeslots are shown via columns and have a granularity at least as small as 30 minute intervals. Times from 12:00 to 12:30, 12:30 to 1:00 . . . 2:00 to 2:30, 2:30 to 3:00 and so forth are visible. Respective entries are directed to respective corresponding media programs 302.

As depicted in the lower portion of FIG. 3, a continuous media stream 108 includes multiple media programs 302 that are arranged sequentially along a media stream. A media program 302-1 is followed consecutively by a media program 302-2, and so forth. From a human sensory or semantic perspective, media program 302-1 is separate from media program 302-2. For example, media program 302-1 may be an awards show, and media program 302-2 may be a local news cast. From a computing device perspective, however, there is not necessarily any clear demarcation along the continuous media stream 108 between the media program 302-1 and the media program 302-2. Consequently, DVRs typically rely on EPG data to determine how to isolate a recording of a requested media program 302.

In FIG. 3, continuous media stream 108 corresponds to the example schedule for the illustrated channel 104. As shown in EPG display 304, channel 104 has a media program extending between 12:00 and 2:00 and another media program extending between 2:00 and 3:00. Selection of a media program, which is represented by the corresponding "Media Program Name" (MPN), can be made by highlighting an EPG display 304 entry using a selection indicator 306-1 or 306-2. Selection indicator 306-1 is highlighting an entry corresponding to media program 302-1. Selection indicator 306-2 is highlighting an entry corresponding to media program 302-2.

Different broadcast times are shown with reference to the media programs 302 of continuous media stream 108. Scheduled broadcast times 308 are indicated with dashed lines, and actual broadcast times 310 are indicated with dotted lines. As used herein, the term "broadcast" refers to media delivery that is at least intended to occur at scheduled times by a network and is not limited to delivery by traditional over-the-air networks. In accordance with EPG display 304, media program 302-1 has a scheduled broadcast start time 308-1 of 12:00 and a scheduled broadcast end time 308-2 of 2:00. In the example of FIG. 3, actual broadcast start time 310-1 and actual broadcast end time 310-2 align with scheduled broadcast start time 308-1 and scheduled broadcast end time 308-2, respectively, because media program 302-1 is not delayed. Similarly, media program 302-2 has a scheduled broadcast start time 308-2 of 2:00 and a scheduled broadcast end time 308-3 of 3:00. In the example of FIG. 3, actual broadcast start time 310-2 and actual broadcast end time 310-3 align with scheduled broadcast start time 308-2 and scheduled broadcast end time 308-3, respectively, because media program 302-2 is also not delayed.

Thus, for the example illustrated in FIG. 3, EPG data 204 that provides the information for EPG display 304 has scheduled broadcast times 308 that match actual broadcast times 310 for the corresponding media programs 302. DVR system 202 of FIG. 2 can therefore use EPG data 204 to accommodate requests 206 to record program content. Unfortunately, actual broadcast times 310 may diverge from scheduled broadcast times 308. Examples of misalignments between scheduled versus actual broadcast times are described below with reference to FIGS. 4 and 5. In other words, FIGS. 4 and 5 depict examples of scenarios in which the reliance solely on EPG data to record requested program content can result in erroneous recordings, such as by omitting requested program content or including extraneous media content material.

Figure 4:
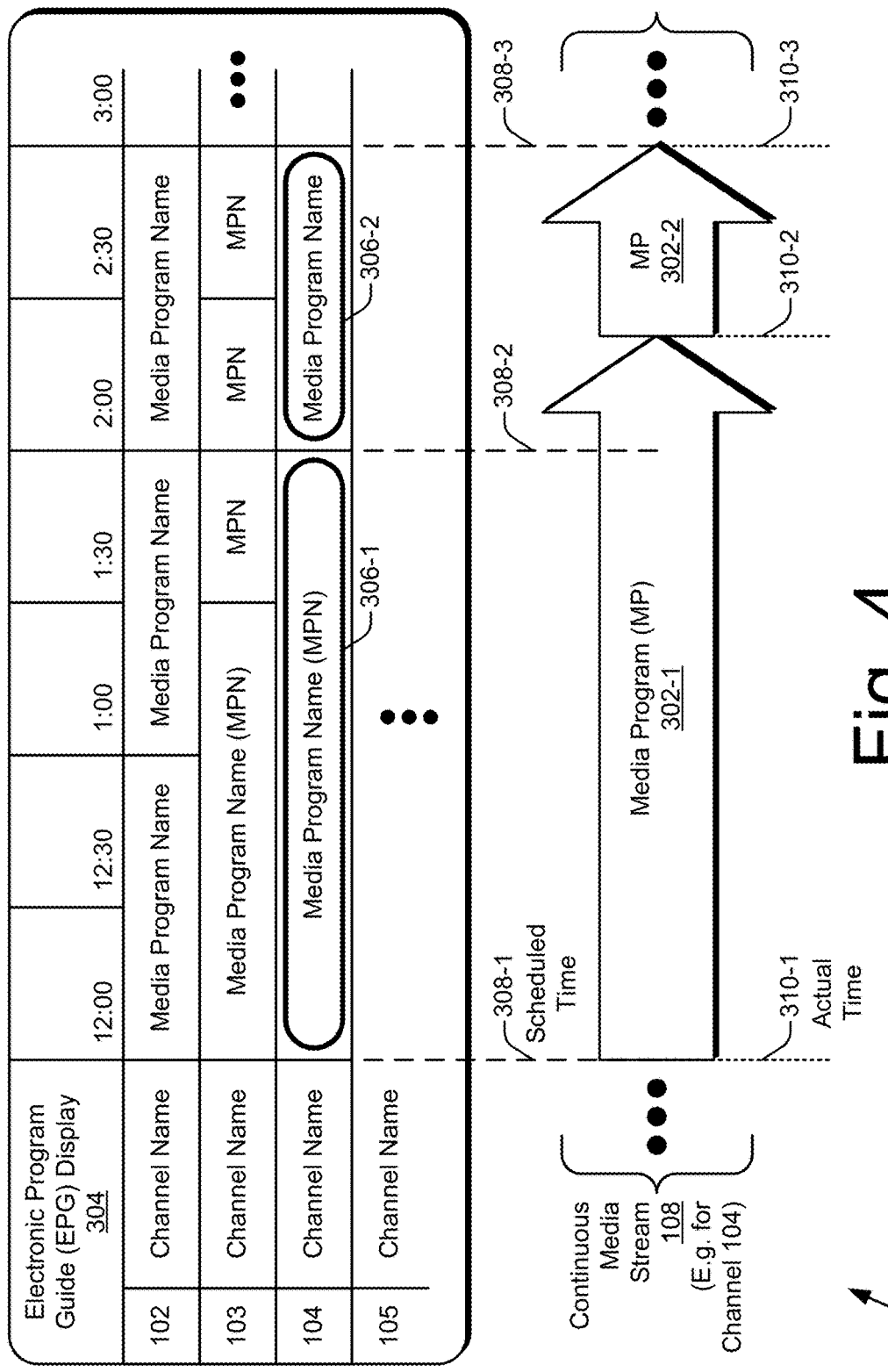
FIG. 4 illustrates an example scenario with media programs having actual broadcast times that are not aligned with scheduled broadcast times.
Figure 5:
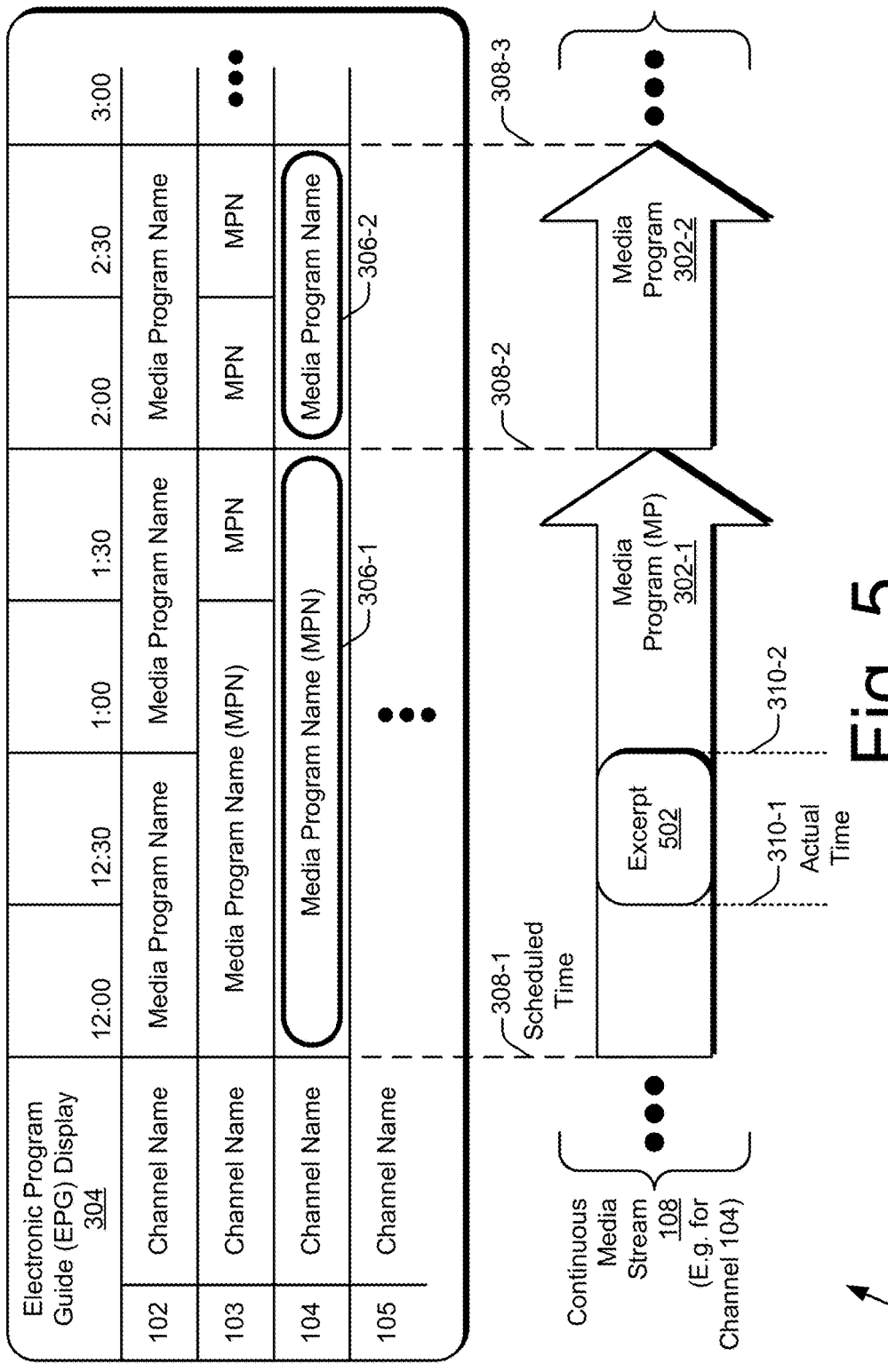
FIG. 5 illustrates an example scenario with a media program having an internal excerpt with actual broadcast times that are not aligned with the scheduled broadcast times of the media program.

FIG. 4 illustrates an example scenario 400 with media programs 302 having actual broadcast times 310 that are not aligned with scheduled broadcast times 308. In scenario 400, media program 302-1 extends beyond a scheduled broadcast end time 308-2. This can happen if, for example, a sporting event goes into extra innings or overtime or is delayed due to weather. Other media programs, especially those for live events, can also last past a scheduled broadcast end time, such as an awards show or a presidential address. Further, a media program for a prerecorded, non-live event can extend past a scheduled broadcast end time if the media program is interrupted, such as for live breaking news, and then continued in its entirety. For these or other reasons, an actual broadcast end time 310-2 for media program 302-1 can occur after the scheduled broadcast end time 308-2.

When media program 302-1 ends late, the succeeding media program 302-2 starts late. Thus, actual broadcast start time 310-2 for media program 302-2 is after the scheduled broadcast start time 308-2 for media program 302-2. As shown, actual broadcast end time 310-3 for media program 302-2 is aligned with the scheduled broadcast end time 308-3. This can occur when media program 302-2 is abbreviated, compressed for time, truncated, or the like in response to starting late. Alternatively, media program 302-2 can be permitted to run in its entirety. In such a situation, the actual broadcast end time for media program 302-2 (which is not explicitly shown in FIG. 4 for this example situation) falls after scheduled broadcast end time 308-3. In this situation, multiple succeeding media programs 302 after media program 302-2 can also be misaligned with scheduled broadcast times until a running time of some program is adjusted or a broadcast day is reset.

If a DVR system relies solely on EPG data 204 for the recording of media program 302-1 or 302-2, an end user does not receive the intended or desired program content that is requested using selection indicator 306-1 or 306-2, respectively. With regard to media program 302-1, a recorded version of continuous media stream 108 would extend from scheduled broadcast start time 308-1 to scheduled broadcast end time 308-2. Consequently, an end user would not be given access to the part of media program 302-1 that is broadcast between scheduled broadcast end time 308-2 and actual broadcast end time 310-2. With regard to media program 302-2, an end user would be able to access all of the program that was broadcast. However, the end user would need to fast-forward over the part of continuous media stream 108 that was recorded between scheduled broadcast start time 308-2 and actual broadcast start time 310-2, which is an inconvenience to the user. Moreover, with reference to the alternative situation described above (but not illustrated) for media program 302-2 in which the program is not altered to fit in the remaining portion of the original timeslot and therefore extends beyond scheduled broadcast end time 308-3, an end user would both be inconvenienced at the front of the recording and still additionally miss the end of the desired program.

FIG. 5 illustrates an example scenario 500 in which a media program 302-1 has an internal excerpt 502 with actual broadcast times 310 that are not aligned with the scheduled broadcast times 308 of the corresponding overall media program 302-1. EPG data 204 provides scheduled broadcast times 308 for an overall media program 302. An end user, however, may wish to record only particular segments or parts of the overall media program 302, which segments or parts are referred to herein as excerpts 502. For example, a swimming enthusiast may wish to record swimming events from various Olympic broadcasts while omitting other events. Or someone who has moved from a particular country that suddenly experiences a natural disaster may want to record any excerpts of a news channel pertaining to the natural disaster throughout the day. As another example, someone else may want to see any scenes that a particular actress is in, regardless of the show or the character the actress is playing.

Because EPG data 204 provides scheduled broadcast times 308 for overall media programs 302, a DVR system cannot obtain from EPG data alone any scheduled broadcast times of internal excerpts 502. Thus, even if EPG data indicates that a requested swimming event is to be shown within media program 302-1 or that a requested actress is to appear as a guest star in media program 302-1, the EPG data merely provides a scheduled broadcast start time 308-1 and a scheduled broadcast end time 308-2 for the overall media program 302-1. These broadcast times 308 do not necessarily align with the actual broadcast start time 310-1 or the actual broadcast end time 310-2 of excerpt 502 and will not align with both of the actual broadcast times 310 for excerpt 502. Although excerpt 502 is depicted as being fully internal to media program 302-1, an excerpt 502 can alternatively form a portion of a given media program 302 that abuts a beginning or an ending of the given media program 302.

Figure 6:
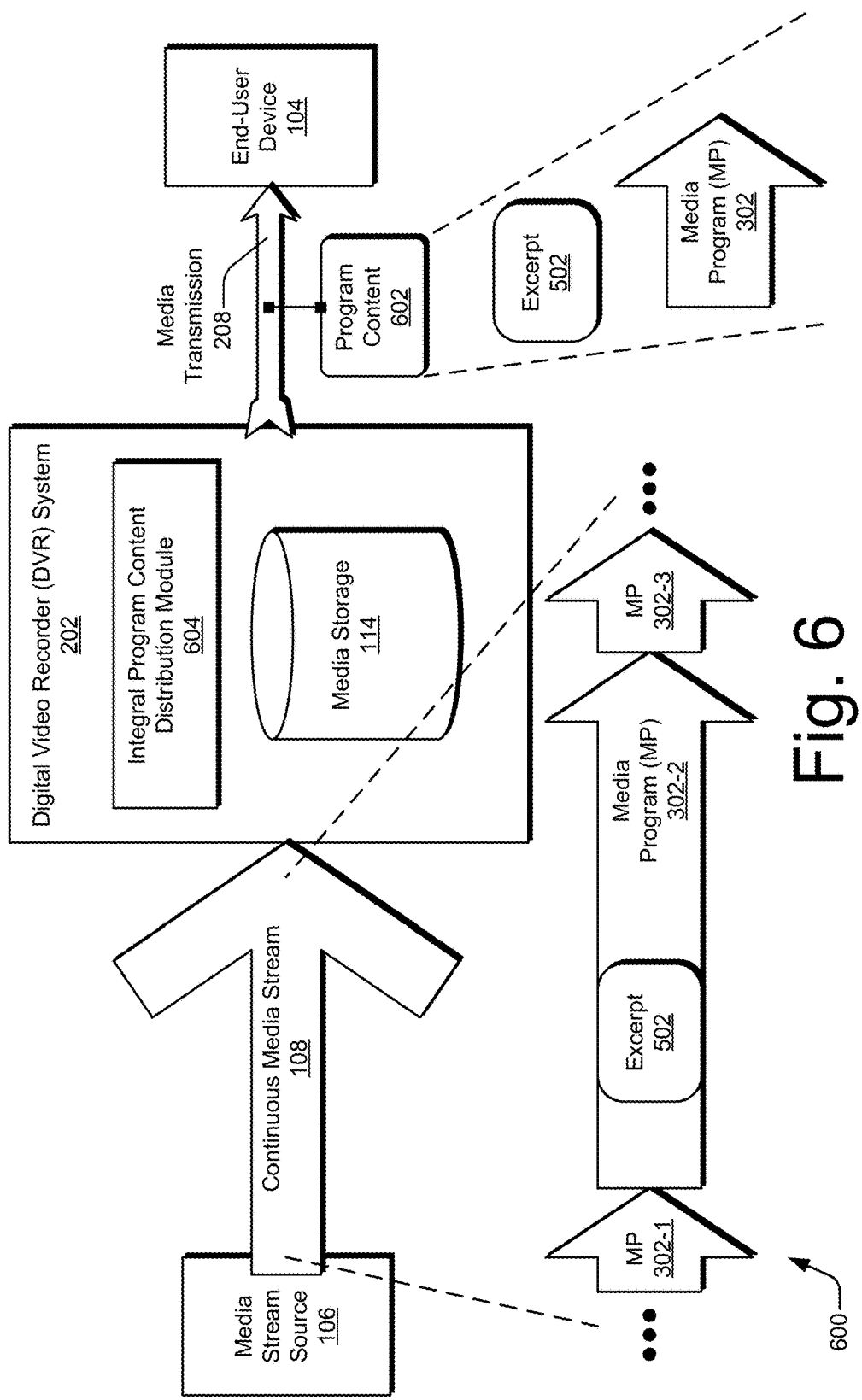
FIG. 6 illustrates an example DVR system that delivers requested program content on an integral basis from a continuous media stream using an integral program content distribution module.

FIG. 6 illustrates a program content delivery scenario 600 including an example DVR system 202 that delivers requested program content 602 on an integral basis from a continuous media stream 108. As described above, continuous media stream 108 arrives at a media program distribution system 102 (of FIG. 2) from a media stream source 106. Continuous media stream 108 provides a sequential arrangement of media programs 302-1, 302-2, 302-3, and so forth with no included indication of separation points between two consecutive media programs 302. DVR system 202 receives continuous media stream 108 and retains at least the program content that has been requested by end users in media storage 114. An integral program content distribution module 604 is implemented to service cloud-based DVR requests received from end-user devices 104.

More specifically, DVR system 202 receives a request 206 (of FIG. 2) including a program content indicator 210 for program content 602 that an end user 118 wishes to have recorded in the cloud. As shown by way of example, program content 602 can include an entire media program 302 or an excerpt 502 of a media program 302. In response to request 206, integral program content distribution module 604 infers actual broadcast start and end times for program content 602 by determining apparent broadcast start and end times. Upon receiving a request to provide recorded program content 602, DVR system 202 delivers the requested program content 602 as part of media transmission 208, which may be implemented in a streaming or atomic download manner.

Regardless of the manner of media transmission 208, program content 602 can be delivered in an integral form. An integral form implies that program content 602 is delivered to a requesting end user as completely as the media content was delivered, even if the media content extends across one or more scheduled broadcast times. An integral form for program content 602 also implies that the recording thereof initiates after a scheduled broadcast start time or terminates prior to a scheduled broadcast end time in accordance with where or when the temporal location of the program content begins or concludes along the corresponding continuous media stream 108. In other words, an integral form of program content 602 is intended to fully include any desired media content received from media stream source 106 while omitting extraneous preceding and succeeding media content. For example, using the algorithms and strategies described below, a boundary of program content can be ascertained to a nearest frame, a nearest group of pictures (GOP), within several seconds, to a nearest commercial break, within a few minutes, and so forth of a program content transition between two different items of program content.

Figure 7:
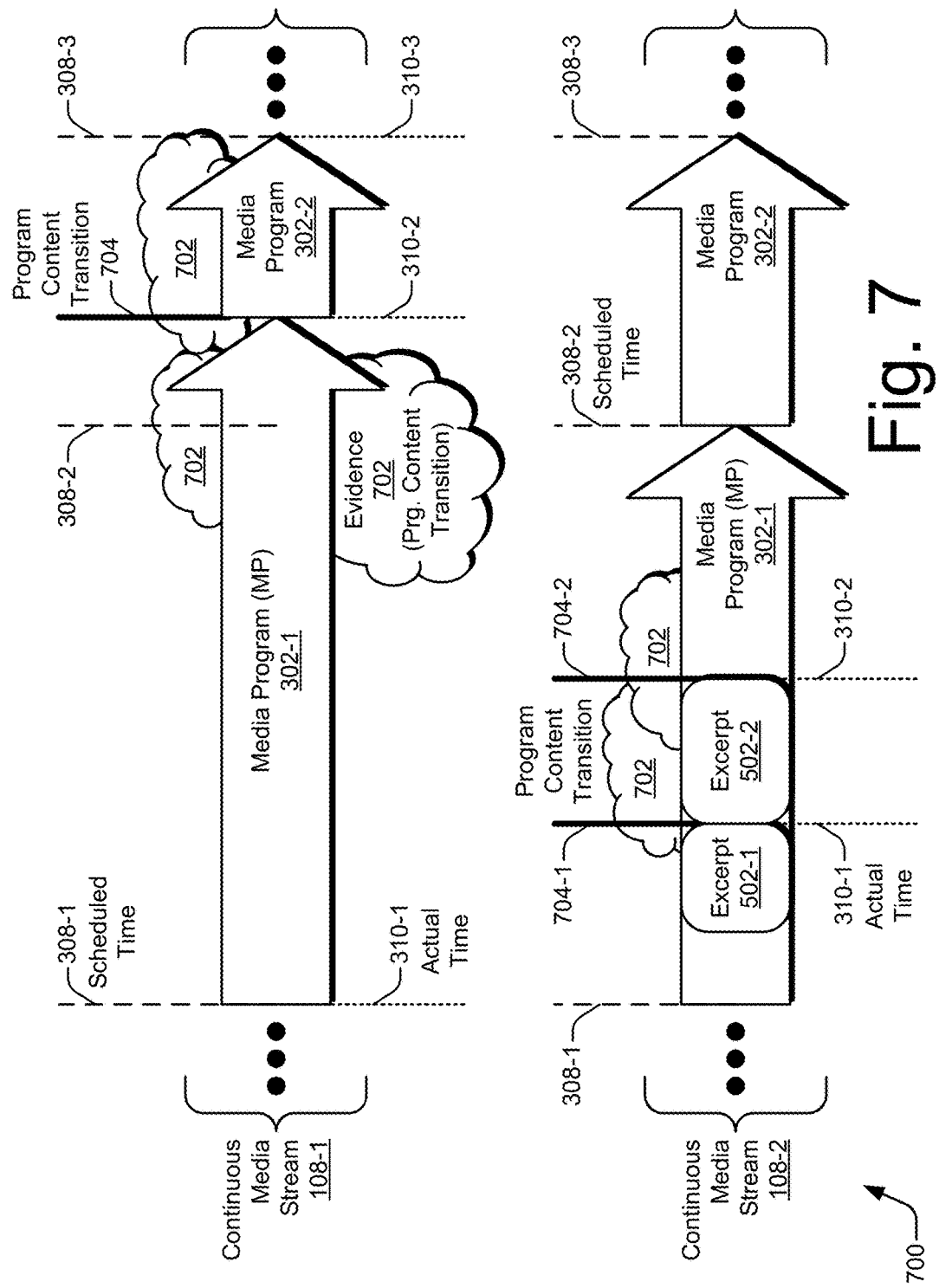
FIG. 7 illustrates examples of program content transitions for different types of program content.

FIG. 7 illustrates generally at 700 examples of program content transitions 704 for different types of program content. A continuous media stream 108-1 is depicted in the top half of FIG. 7, and another continuous media stream 108-2 is depicted in the bottom half. Both continuous media streams 108-1 and 108-2 include program content having actual broadcast times 310 that fail to align with scheduled broadcast times 308.

For continuous media stream 108-1, media program 302-1 has an actual broadcast end time 310-2 that is different from the corresponding scheduled broadcast end time 308-2. Also, media program 302-2 has an actual broadcast start time 310-2 that differs from the corresponding scheduled broadcast start time 308-2. Consequently, if a request has been received from an end-user device 104 to record media program 302-1 or 302-2, DVR system 202 attempts to determine a point, such as a temporal location, of program content transition 704 along continuous media stream 108-1. DVR system 202 determines program content transition 704, which corresponds to actual broadcast time 310-2, based on evidence 702 of a program content transition. Evidence 702 can be obtained from one or more content information sources, which are described below with reference to FIG. 9. Content information sources provide indications of program content transitions 704. Such indications are described below with reference to FIGS. 8 and 11.

For continuous media stream 108-2, excerpt 502-2 follows excerpt 502-1 along media program 302-1. Being an excerpted portion of media program 302-1, excerpt 502-2 has at least one actual broadcast time 310 that differs from scheduled broadcast times 308-1 and 308-2 of the overall media program 302-1. As shown, excerpt 502-2 has an actual broadcast start time 310-1 that is different from the scheduled broadcast start time 308-1 of the corresponding media program 302-1. Excerpt 502-2 also has an actual broadcast end time 310-2 that is different from the scheduled broadcast end time 308-2 of the corresponding media program 302-1. Consequently, if a request has been received from an end-user device 104 to record excerpt 502-2, DVR system 202 attempts to determine points for program content transition 704-1 and 704-2. DVR system 202 determines program content transitions 704-1 and 704-2, which correspond respectively to actual broadcast times 310-1 and 310-2, based on evidence 702 of program content transitions. Evidence 702 can be provided by indications of program content transition, which are described next with reference to FIG. 8.

Figure 8:
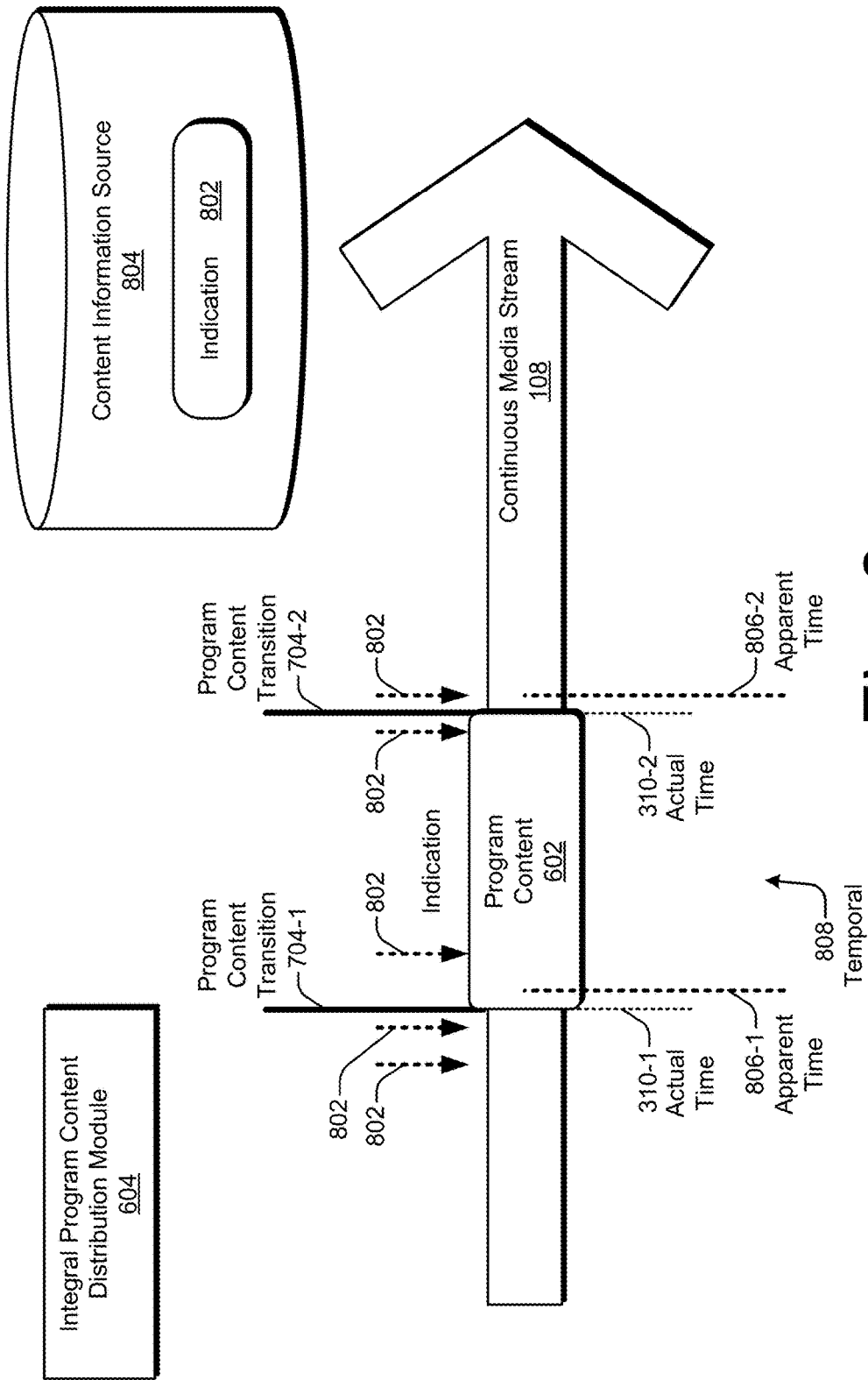
FIG. 8 illustrates program content in relation to different broadcast times and indications of program content transition.

FIG. 8 illustrates program content 602 with regard to different broadcast times 310 and 806 and in relation to various indications 802 of program content transitions 704. Program content 602 occurs or is positioned at some temporal location 808 along continuous media stream 108 as determined by one or more broadcast times, such as actual broadcast times 310 or apparent broadcast times 806. At the beginning and at the conclusion of program content 602 is a respective program content transition 704. Depending on the type of program content 602 (e.g., a media program 302 or an excerpt 502 of a media program 302), a program content transition 704 may correspond to a media program transition or an excerpt transition. As shown, an initial program content transition 704-1 corresponds to actual broadcast start time 310-1, and a terminal program content transition 704-2 corresponds to actual broadcast end time 310-2.

In an example operation, integral program content distribution module 604 is implemented to inferentially determine temporal locations of initial program content transition 704-1 and terminal program content transition 704-2. To do so, integral program content distribution module 604 obtains one or more indications 802 of program content transition. Indications 802 can be obtained from one or more content information sources 804, such as internet-based sources or the actual media content of continuous media stream 108. Examples of content information sources 804 are described below with reference to FIG. 9.

Indications 802 are depicted as pointing towards or corresponding to various temporal locations along continuous media stream 108. This represents that an indication 802 can be extracted from a corresponding location; that an indication 802 points, references, or pertains to a corresponding location; some combination thereof; and so forth. Independently or in combination, one or more indications 802 provide evidence indicative of at least one apparent broadcast time 806. To isolate program content 602 and thereby enable integral delivery of program content 602 to a requesting end-user device 104, integral program content distribution module 604 determines an apparent broadcast start time 806-1 and an apparent broadcast end time 806-2.

Using indications 802, integral program content distribution module 604 attempts to determine apparent broadcast times 806 that align with actual broadcast times 310 for the convenience of the end user. More specifically, integral program content distribution module 604 attempts to determine an apparent broadcast start time 806-1 that matches actual broadcast start time 310-1 and an apparent broadcast end time 806-2 that matches actual broadcast end time 310-2 as is described above in the context of the term "integral." The closer apparent broadcast start time 806-1 is to being aligned with actual broadcast start time 310-1 and apparent broadcast end time 806-2 is to being aligned with actual broadcast end time 310-2, the more likely that the end user's wishes or intentions are being met. In other words, the likelihood increases that requested program content 602 is being delivered without omitting desired media content and without including extraneous media content.

Figure 9:
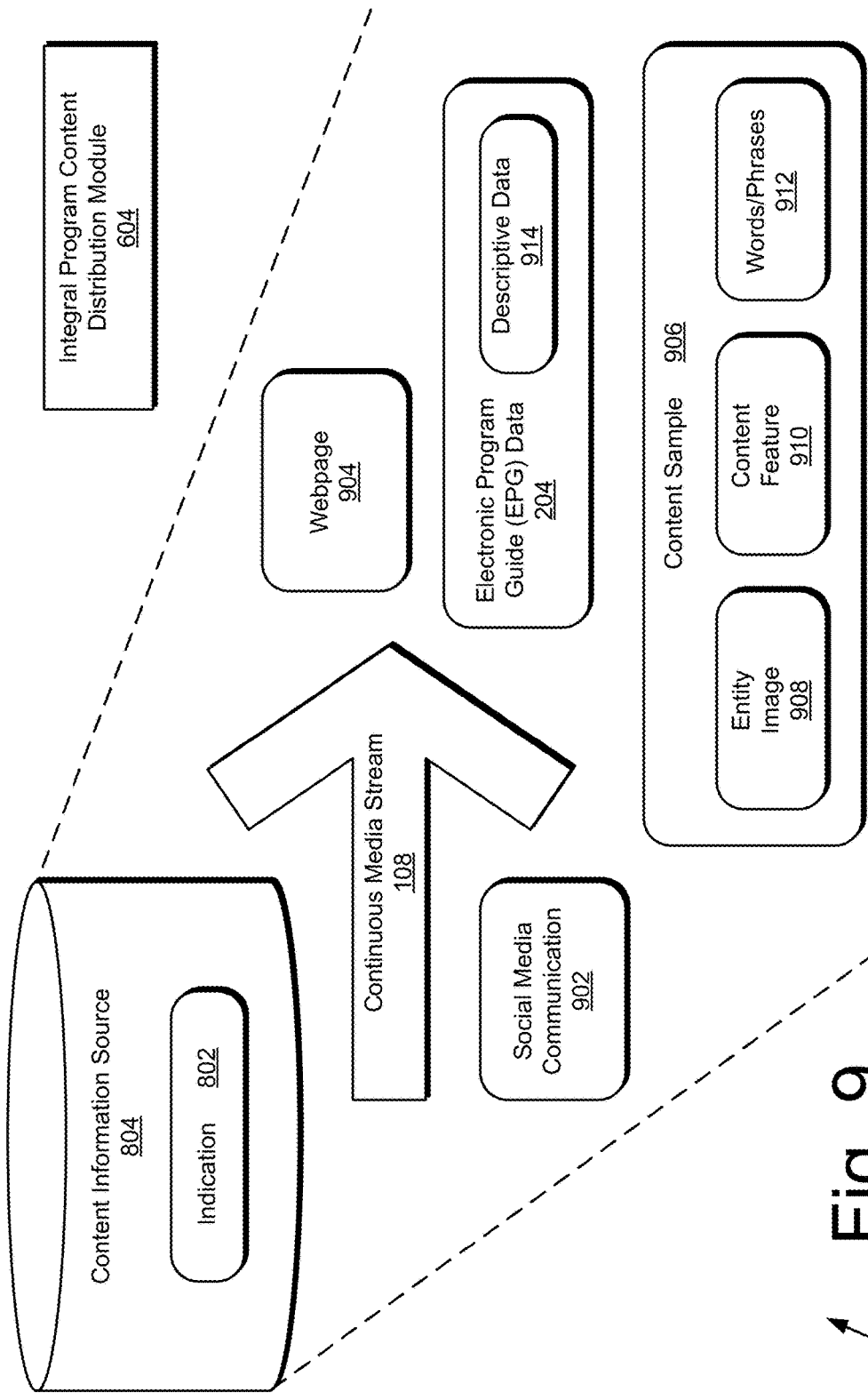
FIG. 9 illustrates examples of content information sources from which indications of a program content transition can be obtained.

FIG. 9 illustrates examples of content information sources 804 from which indications 802 of a program content transition can be obtained. Examples of content information sources 804 include a continuous media stream 108 that is expected to have requested program content, EPG data 204, at least one social media communication 902, at least one webpage 904, one or more content samples 906, and combinations thereof. Content samples 906 can include at least one entity image 908, one or more content features 910, words or phrases 912, combinations thereof, and so forth.

Integral program content distribution module 604 can obtain indications 802 from continuous media stream 108 at one or more constituent portions thereof. For instance, the video, audio, or closed captioning content of continuous media stream 108 can be analyzed for evidence of a program content transition. Implementations involving indications 802 that are obtained from a continuous media stream 108 are described below with reference to FIGS. 10 and 11.

EPG data 204 can provide indications 802 in a number of different manners. For example, EPG data 204 specifies scheduled broadcast times, which can be used as starting points to search along a continuous media stream 108 for indications 802 of apparent broadcast times that are included within the continuous media stream 108. Also, each respective entry of EPG data 204, which corresponds to a respective media program 302, includes descriptive data 914 of the corresponding media program 302. Such descriptive data 914 can identify media personalities, such as Hollywood stars or talk show guests, that are expected to appear in the media program 302. Descriptive data 914 can also indicate which topics or sports events have segments devoted to them in a particular media program 302. These kinds of information about media content can be useful for detecting when or if requested program content has started being broadcasted and also for detecting that succeeding content has started being broadcasted.

Social media communications 902 and webpages 904 can include similar types of indications 802, but social media communications 902 tend to have information that is more current, such as being up-to-the-minute or even the second. For example, a social media communication 902 may announce when a sporting event is delayed due to a weather delay or may mention a game-winning play at a certain time.

Social media communications 902 include messages, comments, tweets, postings, and the like. Webpages 902 can include comments by users as well as reviews, blogs, editorials, etc. that may mention that a given entity was shown during a particular media program 302 or even at a certain time of a particular media program 302. Such older information about media content can also be used for rebroadcasts, especially to meet a request for program content that is found as an excerpt of a media program 302. Social media communications 902 and webpages 904 can also be used to obtain content samples 906.

Generally, content samples 906 include samples of different types of media content, such as video, static images, sounds, words or phrases, combinations thereof, and so forth. As depicted in FIG. 9, content samples 906 can include one or more entity images 908, at least one content feature 910, words or phrases 912, a combination thereof, and so forth. Examples of aural content samples 906 include sound samples, such as voice samples, crowd noise samples, theme or intro music samples, and so forth. Words or phrases 912 include those terms that are indicative of a program content transition. Examples of such words include: "we now join our regularly scheduled program in progress," "we would like to welcome the viewers of the 'team x' and 'team y' game," and "we will now take you to our regularly scheduled show that is to be shown in its entirety."

Entity images 908 can be gathered from individual photos or from frames of videos. Examples of entity images 908 include faces of media personalities, pictures of playing surfaces of sporting events (e.g., a football field, a basketball court, or a swimming pool), and pictures of studios (e.g., of a newscast or a talk show). Content features 910 include those features that are produced by applying a machine learning system (e.g., a neural network) to media content or those that are discernable to human senses. Content features 910 may be directed at least to video or audio portions of a continuous media stream 108. Examples of content features 910 include a proportion of screen area covered by a particular color (e.g., the green of a soccer pitch), graphic overlays that provide information for an event of a current media program (e.g., score, down and distance, and time remaining), graphic overlays that provide information for other events (e.g., a running visual ticker of scores of other games, news items, or upcoming discussion topics), end-of-show splash screens for associated producing and distributing companies, theme music for a show intro or outro portion, show-specific insignia overlays in the corner of a screen, crowd noise, and combinations thereof.

Figure 10:
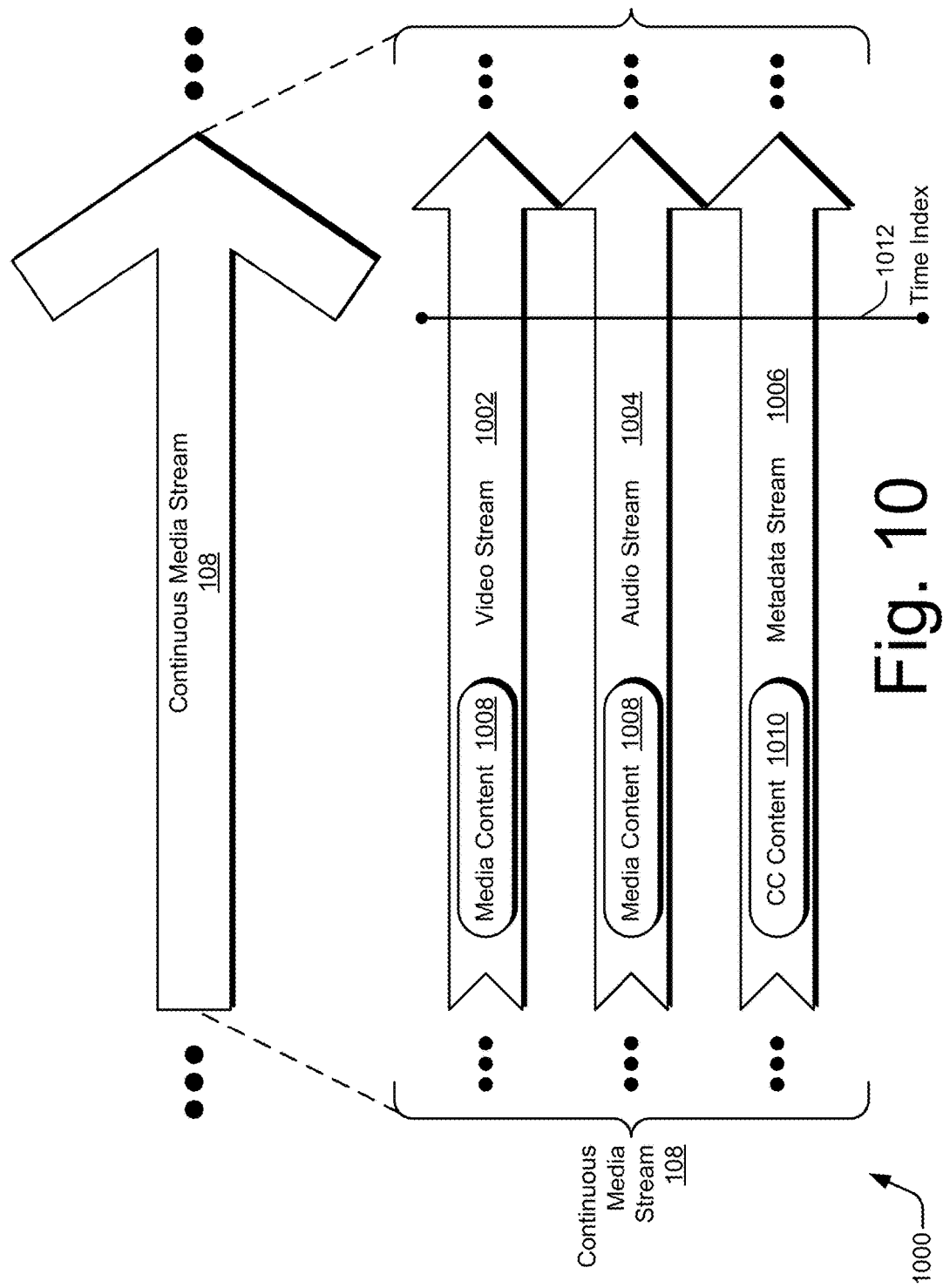
FIG. 10 illustrates multiple portions of a continuous media stream.

FIG. 10 illustrates an exploded view 1000 of a continuous media stream 108 having multiple portions. Example portions of continuous media stream 108 include a video stream 1002, an audio stream 1004, and a metadata stream 1006. Video stream 1002 and audio stream 1004 have media content 1008. Specifically, video stream 1002 include visual media content 1008, and audio stream 1004 includes aural media content 1008. Video stream 1002 an audio stream 1004 may be encoded separately or jointly using one or more codecs, such as the H.265 codec or one of the other H.26x codecs. Using a video codec to decode video stream 1002, video stream 1002 is separable into individual frames or groups of pictures (GOPs). Metadata stream 1006 can include data that is associated with a current time index 1012 for corresponding video stream 1002 or audio stream 1004 or data that is associated with a corresponding overall media program 302. An example of content for metadata stream 1006 is closed captioning (CC) content 1010.

Figure 11:
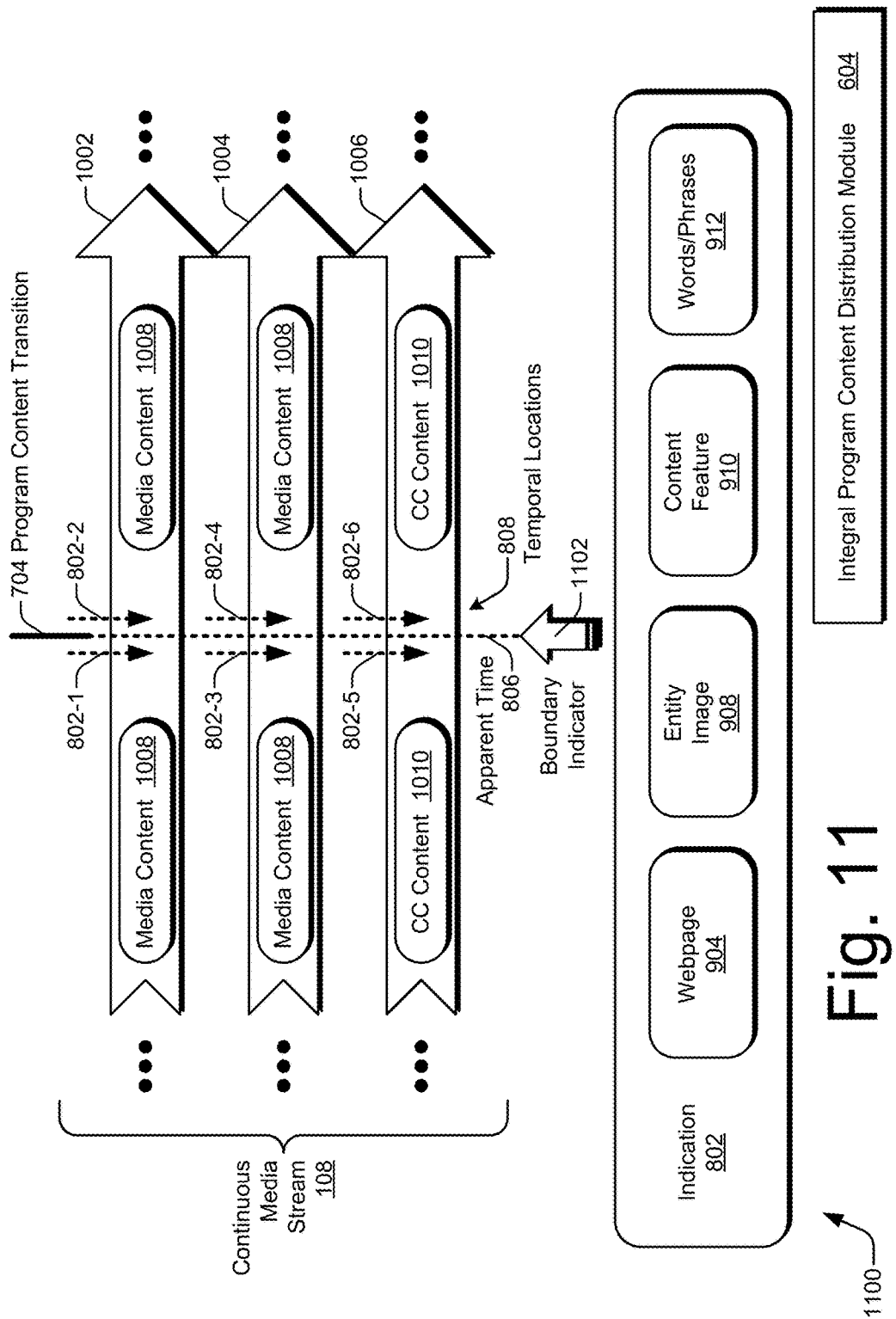
FIG. 11 illustrates example applications of different indications of a program content transition to determine an apparent broadcast time.

FIG. 11 illustrates example applications 1100 of different indications 802 of a program content transition 704 that are usable to determine an apparent broadcast time 806. Video stream 1002 and audio stream 1004 include media content 1008. Metadata stream 1006 includes closed captioning content 1010. Indications 802-1 to 802-6 that are each represented by a respective dotted line arrow are also indicative of an example temporal location 808 corresponding to the respective indication 802. Along video stream 1002, indication 802-1 is located prior to program content transition 704, and indication 802-2 is located after program content transition 704. Along audio stream 1004, indication 802-3 is located prior to program content transition 704, and indication 802-4 is located after program content transition 704. Along metadata stream 1006, indication 802-5 is located prior to program content transition 704, and indication 802-6 is located after program content transition 704. Additionally, other indications 802 obtained from other example content information sources are shown in FIG. 11. These other indications 802 include webpage 904, entity image 908, content features 910, and words or phrases 912 that are indicative of a program content transition.

In operation, integral program content distribution module 604 infers apparent broadcast time 806 by determining program content transition 704 based on one or more indications 802 and by using program content transition 704 as a proxy for apparent broadcast time 806. Multiple mutually-supporting or conflicting indications 802 may be processed by integral program content distribution module 604 with different weights applied to different types of indications 802. For example, an indication 802 from CC content 1010 in conjunction with an indication 802 from word or phrases 912 may be weighted more heavily than an indication 802 from aural media content 1008 in conjunction with voice samples.

Once an apparent broadcast time 806 has been determined, a boundary indicator 1102 can be stored directly or indirectly in association with continuous media stream 108. Boundary indicator 1102 can be implemented as a set of numbers representing a day and time index (e.g., time index 1012 of FIG. 10) linked to continuous media stream 108 for apparent broadcast time 806, a pointer referencing a temporal or decoding position along continuous media stream 108, data inserted into metadata 1006 based on the determined location of program content transition 704, some combination thereof, and so forth. Boundary indicator 1102 can be stored as part of information for a corresponding media program 302 that augments or overrides other data, as part of continuous media stream 108, as part of the DVR information appended to program content 602 requested by an end-user device 104, in association with a request 206, combinations thereof, and so forth.

Multiple example applications of indications 802 to determine apparent broadcast time 806 are described below with reference to example ones of indications 802-1 to 802-6. In an example application using words or phrases 912, aural media content 1008 from audio stream 1004 or CC content 1010 is monitored to extract data for an indication 802-3, 802-4, 802-5, or 802-6. Aural words can be converted to text. The converted text or the CC text is compared to the text from the words or phrases 912. If integral program content distribution module 604 detects a match between the text from continuous media stream 108 and the text from words or phrases 912, a program content transition 704 has apparently been ascertained. Accordingly, integral program content distribution module 604 can store a boundary indicator 1102 for the corresponding time index along continuous media stream 108.

In an example application using content features 910 and audio stream 1004, sounds are extracted from audio stream 1004 as an indication 802-3 or 802-4 are compared to sounds stored as part of content features 910. In one example, the aural features of background crowd noise during sporting events are characterized. The initiation of sounds along audio stream 1004 that match such aural features indicate a program content transition 704 corresponding to an apparent broadcast start time for a sporting event. The termination of sounds along audio stream 1004 that match such aural features indicate a program content transition 704 corresponding to an apparent broadcast end time 806 for a sporting event.

In another example, the aural features of intro or outro theme music—such as that played during opening or closing credits—for particular media programs 302 are characterized. Detection of sounds from audio stream 1004 that match outro theme music for an adjacent, but preceding, media program 302 of a requested media program 302 serves as an indication 802-3 of an apparent broadcast start time 806 for the requested media program 302. Detection of sounds from audio stream 1004 that match intro theme music for an adjacent, but succeeding, media program 302 of a requested media program 302 serves as an indication 802-4 of an apparent broadcast end time 806 for the requested media program 302.

In an example application using entity images 908 and video stream 1002, visual media content 1008 extracted from video stream 1002 is compared to entity images 908. In one example, entity images 908 can include those indicative of requested program content, such as blue water for a swimming event or white stripes against a green background for a football game. The presence or absence of such entity images 908 in visual media content 1008 at indications 802-1 or 802-2 of video stream 1002 indicates the current existence or non-existence, respectively, of requested program content. Entity images 908 can additionally or alternatively include facial images of media personalities that are to appear as part of requested program content.

In another example, however, entity images 908 include facial images of media personalities that are not expected to appear in a requested media program 302 but are expected to appear in an adjacent media program 302. Thus, the presence of such media personalities serves as an indication 802-1 or 802-2 that a program content transition 704 has occurred between a requested and a non-requested media program 302. In operation, DVR system 202 can access a content information source 804 having entity images 908 for those media personalities that are scheduled to appear in a succeeding media program 302—such as analysts of a post-game sports show or stars of a sitcom. Content information source 804 can be a proprietary database, a public webpage 904, some combination thereof, and so forth. Integral program content distribution module 604 then monitors video stream 1002 to detect faces present in the media content 1008 thereof. Detected faces are compared to obtained facial pictures of entity images 908. If a content match is discovered along video stream 1002, integral program content distribution module 604 determines an apparent broadcast time 806 accordingly and stores a boundary indicator 1102 at the corresponding time index.

Figure 12:
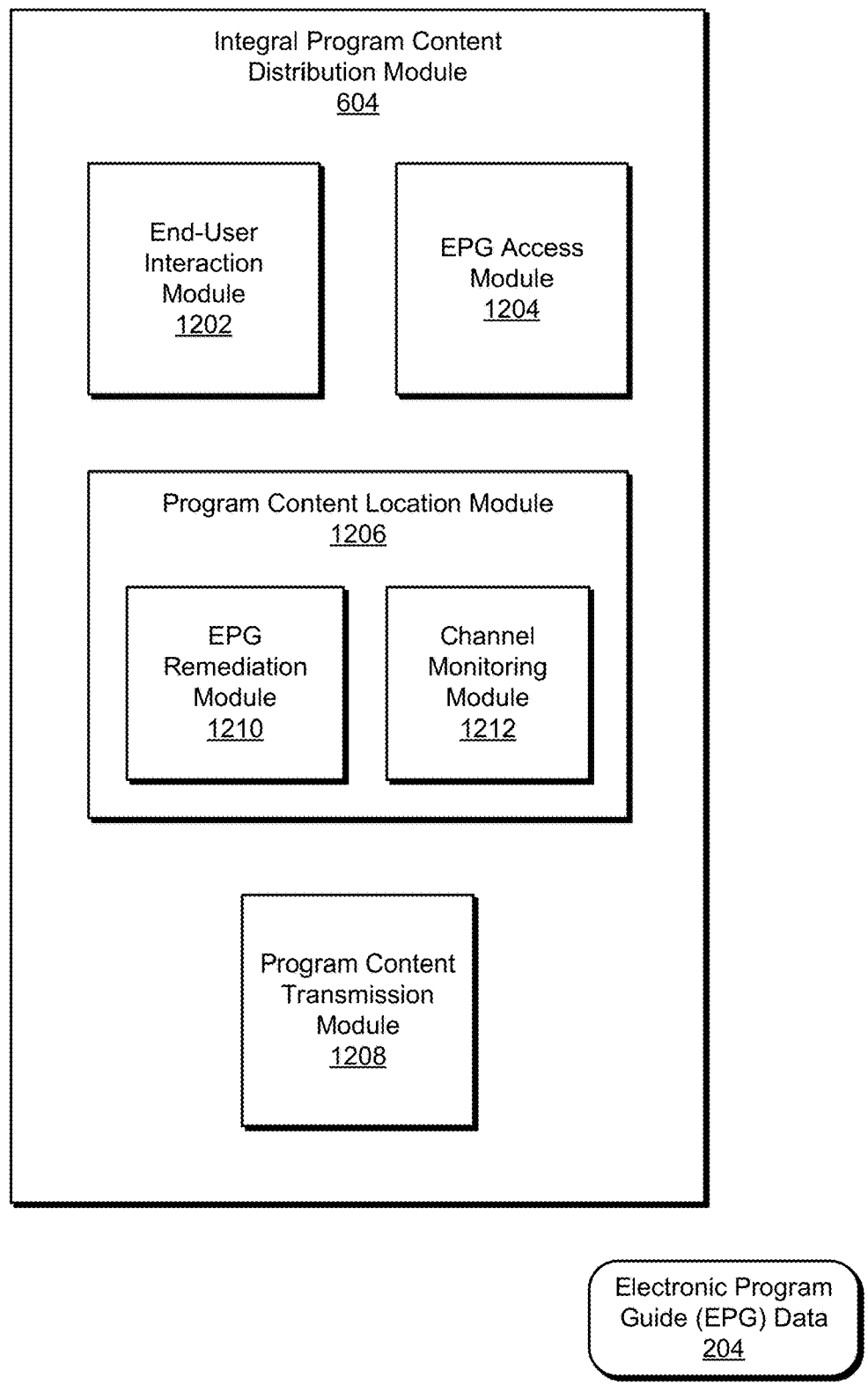
FIG. 12 illustrates an example integral program content distribution module.

FIG. 12 illustrates an example integral program content distribution module 604 in conjunction with EPG data 204. The modules of FIG. 12 are described below with reference to items depicted in earlier figures. EPG data 204 can be organized in accordance with multiple channels from multiple media stream sources 106 across multiple timeslots, such as 1:00 PM to 4:00 PM. EPG data 204 includes respective entries that correspond to respective media programs 302 that map to a channel of the multiple channels and a timeslot of the multiple timeslots. Each respective entry associates one or more scheduled broadcast times 308 with the corresponding respective media program 302. As shown, integral program content distribution module 604 includes multiple modules: an end-user interaction module 1202, an EPG access module 1204, a program content location module 1206, and a program content transmission module 1208. Program content location module 1206 includes an EPG remediation module 1210 and channel monitoring module 1212.

In example implementations, end-user interaction module 1202 accepts from an end-user device 104 a request 206 to record program content 602. Request 206 includes program content indicator 210 for program content 602. If EPG data 204 is to be accessed to service a given request 206, EPG access module 1204 accesses EPG data 204 based on program content indicator 210 for program content 602 to ascertain a channel and a scheduled broadcast time 308 corresponding to program content 602.

Program content location module 1206 determines a temporal location 808 of program content 602 along the ascertained channel with regard to a corresponding continuous media stream 108 thereof. Temporal location 808 includes an apparent broadcast time 806 that differs from the ascertained scheduled broadcast time 308. Program content transmission module 1208 transmits to end-user device 104 the located program content 602 responsive to the temporal location 808. For example, program content transmission module 1208 can transmit a part of the corresponding continuous media stream 108 for the ascertained channel such that the transmission starts or ends at the apparent broadcast time 806 of temporal location 808.

In other implementations, EPG remediation module 1210 computes the apparent broadcast time 806 of program content 602 to adjust program content transmission if the scheduled broadcast time 308 fails to align with temporal location 808 of program content 602. Channel monitoring module 1212 monitors a channel by analyzing a corresponding continuous media stream 108 to search for evidence 702 of media program transitions 704 within or between media programs 302 arranged sequentially along continuous media stream 108. The modules of FIG. 12 illustrate one approach to realizing computing logic to implement the described techniques, but other approaches may alternatively be utilized.

Example Methods

Figure 13:
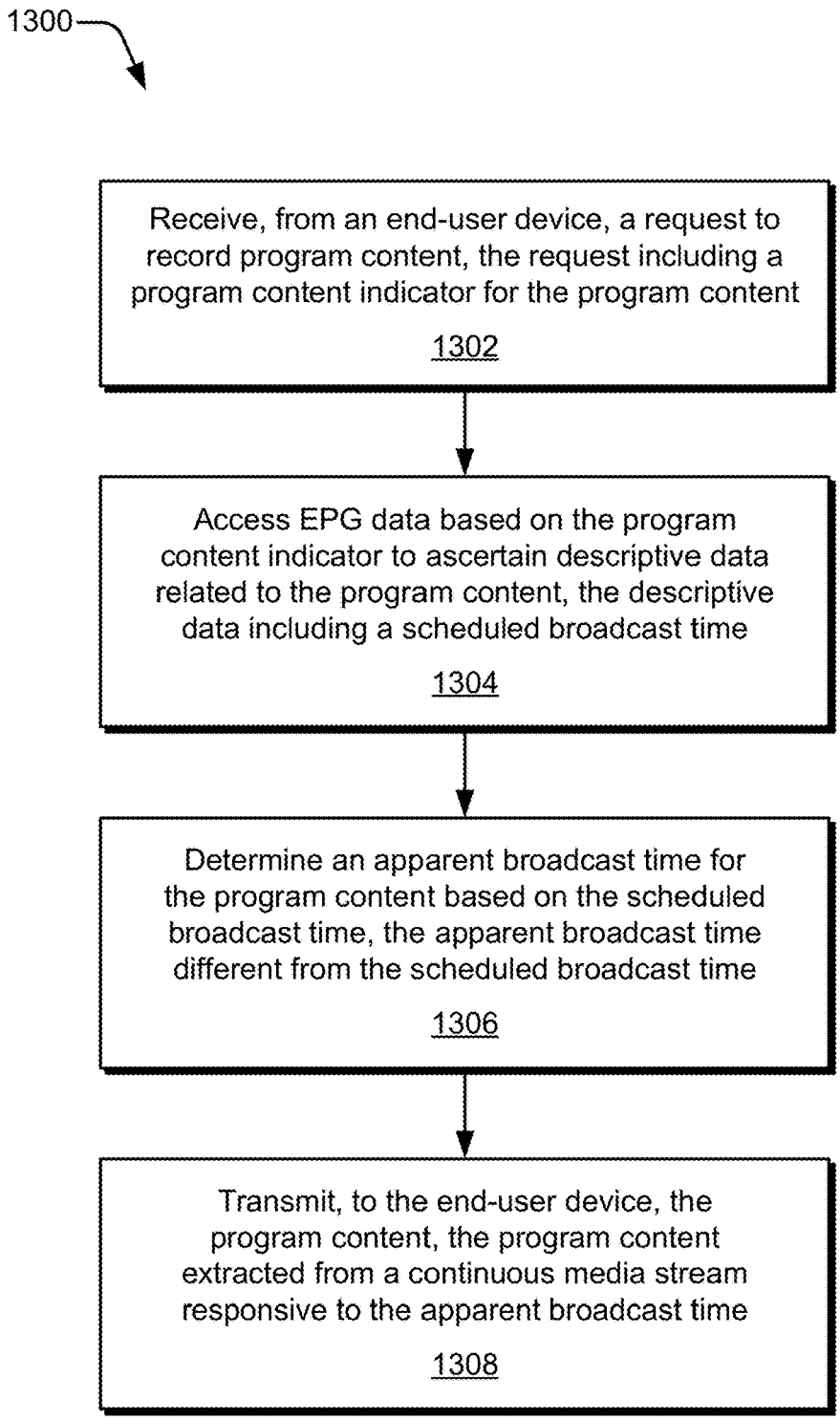
FIG. 13 illustrates an example method for integral program content distribution.
Figure 14:
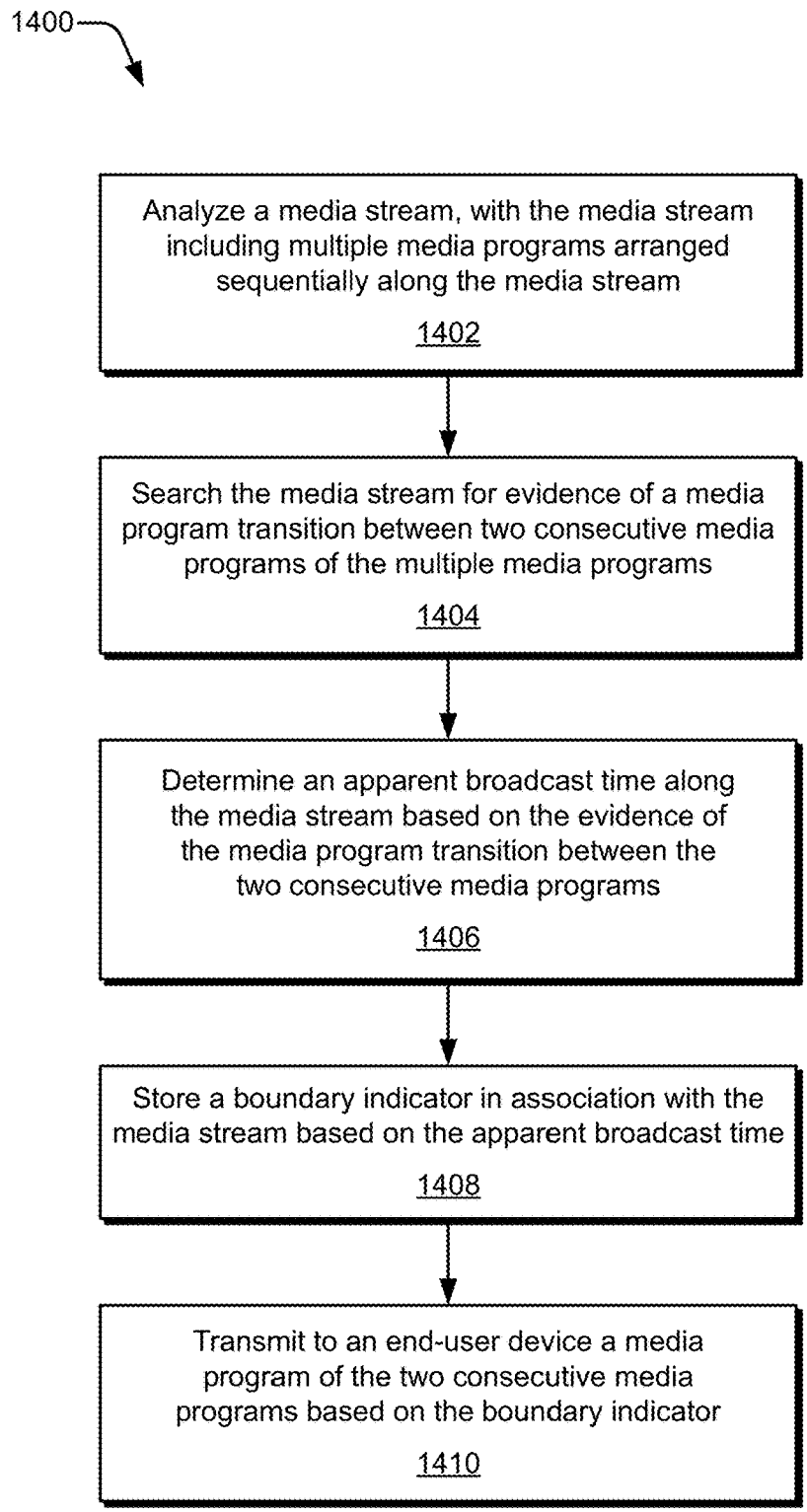
FIG. 14 illustrates another example method for integral program content distribution.

FIGS. 13 and 14 depict methods enabling integral program content distribution. These methods are shown as sets of blocks that specify operations performed but are not necessarily limited to the order or combinations shown for performing the operations by the respective blocks, for the operations can be implemented in alternative orders or in a fully or partially overlapping manner In portions of the following discussion, reference may be made to the items shown in previous FIGS. 1-12, but such references are made by way of example only. The methods can be implemented, for example, by computing infrastructure in a data center.

FIG. 13 illustrates an example method 1300 for integral program content distribution that includes four blocks 1302-1308. Although method 1300 can also pertain to program content 602 that comprises a full media program 302, program content 602 comprises an excerpt 502 of a full media program 302 in the example described below. At 1302, a DVR system 202 receives from an end-user device 104 a request 206 to record program content 602, with request 206 including a program content indicator 210 for program content 602. Here, program content indicator 210 includes a name of an actress, and request 206 is for appearances of the actress as herself. Thus, an integral program content distribution module 604 can receive a request 206 to record an excerpt 502 in which the named actress appears.

At 1304, DVR system 202 accesses EPG data 204 based on program content indicator 210 for program content 602 to ascertain descriptive data 914 related to the requested program content 602. Descriptive data 914 includes a scheduled broadcast time 308. For example, an integral program content distribution module 604 can use the name of the actress to find an entry in EPG data 204 indicating that the actress is expected to appear as herself on a nightly talk show at scheduled broadcast time 308.

At 1306, DVR system 202 determines apparent broadcast time 806 for requested program content 602 based on scheduled broadcast time 308, with apparent broadcast time 806 being different from scheduled broadcast time 308. Scheduled broadcast time 308 corresponds to the scheduled broadcast start time or end time of the overall talk show. However, excerpt 502 in which the actress appears occurs during a middle segment of the talk show and thus has different actual start and end broadcast times 310. In an example implementation, a content information source 804 can be accessed to obtain an indication 802 of an apparent broadcast time 806 of requested program content 602. For instance, integral program content distribution module 604 can access a website having webpages 904 that serve as a content information source 804 usable to obtain facial images of the identified actress. The facial images therefore serve as one or more entity images 908 in this instance.

To determine apparent broadcast time 806, integral program content distribution module 604 extracts recognized faces from one or more frames at indication 802-1 or 802-2 of video stream 1002 of the media program 302 talk show based on scheduled broadcast time 308 being a starting point along video stream 1002. Thus, the talk show itself also serves as a content information source 804 in this example. The recognized faces are compared to the facial images of the requested actress (e.g., entity images 908) to find content matches and therefore isolate the segment of the talk show that includes the actress. The isolated segment comprises excerpt 502 having an apparent broadcast time 806, such as an apparent broadcast start time 806-1 or an apparent broadcast end time 806-2.

At 1308, media program distribution system 102 transmits to end-user device 104 requested program content 602 after extracting program content 602 from a continuous media stream 108 responsive to apparent broadcast time 806. For example, integral program content distribution module 604 can extract excerpt 502 based on time indexes 1012 of continuous media stream 108 that correspond to apparent broadcast start time 806-1 and apparent broadcast end time 806-2. DVR system 202 can then stream or atomically deliver excerpt 502 to end-user device 104. Guard time periods, such as 10% of the length of excerpt 502 or 1-2 minutes of media content, can be included with the transmission at the beginning or the end of excerpt 502 to accommodate inadvertent misalignments. Alternatively, DVR system 202 can enable an end user to rewind or fast-forward throughout a media program 302 from which excerpt 502 is extracted, even though the media content for excerpt 502 is initiated at apparent broadcast start time 806-1 and set to terminate as a default at apparent broadcast end time 806-2.

FIG. 14 illustrates an example method 1400 for integral program content distribution that includes five blocks 1402-1410. For the example of method 1400, program content 602 comprises a media program 302. At 1402, a DVR system 202 analyzes a media stream—such as a continuous media stream 108. The media stream includes multiple media programs 302 arranged sequentially over time along the media stream. Thus, two adjacent media programs 302 can be separated by a program content transition 704 that may not align with a scheduled broadcast time 308 due to a delay or extended broadcast period.

At 1404, DVR system 202 searches the media stream for evidence 702 of a media program transition (e.g., a program content transition 704 that lies) between two consecutive media programs 302 of the multiple media programs 302. For example, an integral program content distribution module 604 can obtain indications 802 intrinsically from the media stream, which serves as a content information source 804. For intrinsic indications, a first indication 802-1 can include first media content corresponding to a visual portion or area of a display of video having a constant appearance over a first time period—such as when a sporting event has a superimposed graphic with the current score and time remaining. Although values of a countdown timer and scores may change over time, the area of the display is nevertheless considered to have a constant appearance as compared to typical areas of a video of a sporting event. A second indication 802-2 can include second media content having a changing appearance over a second time period such as most areas of typical sporting as well as non-sporting television programs. Although this example uses at least two intrinsically-obtained indications 802, integral program content distribution module 604 can additionally or alternatively obtain other indications 802 from one or more other, extrinsic content information sources 804.

At 1406, DVR system 202 determines an apparent broadcast time 806 along the media stream based on evidence 702 of a media program transition 704 between two consecutive media programs 302. Apparent broadcast time 806 is inferred from the existence of a detected program content transition 704. To do so, integral program content distribution module 604 compares first indication 802-1 having the first media content to second indication 802-2 having the second media content. A content difference between a relatively constant appearance during the first time period and a relatively varying appearance during the second time period is indicative of a program content transition 704 between the two time periods.

At 1408, DVR system 202 stores a boundary indicator 1102 in association with the media stream based on apparent broadcast time 806. Boundary indicator 1102 enables identification of an initiating time or a terminating time for requested program content 602. Thus, boundary indicator 1102 can be stored as part of the DVR data for a particular end user or end-user device 104 or as part of metadata stream 1006 for a corresponding continuous media stream 108.

At 1410, media program distribution system 102 transmits to an end-user device 104 a media program 302 of the two consecutive media programs based on boundary indicator 1102. For example, DVR system 202 can cause transmission of media content from a media stream starting or ending at the apparent broadcast time 806 referenced by boundary indicator 1102.

The preceding discussion describes methods relating to integral program content distribution. Aspects of these methods may be implemented in hardware (e.g., fixed logic circuitry), firmware, software, manual processing, or any combination thereof. These techniques may be embodied on one or more of the computing devices shown in FIG. 1, 2, or 6 (or computing system 1500 that is described in FIG. 15 below), which may be further divided, combined, and so on. Thus, these figures illustrate some of the many possible systems or apparatuses capable of employing the described techniques. The items in these figures generally represent software, firmware, hardware, whole devices or networks, or a combination thereof.

Example Computing System

Figure 15:
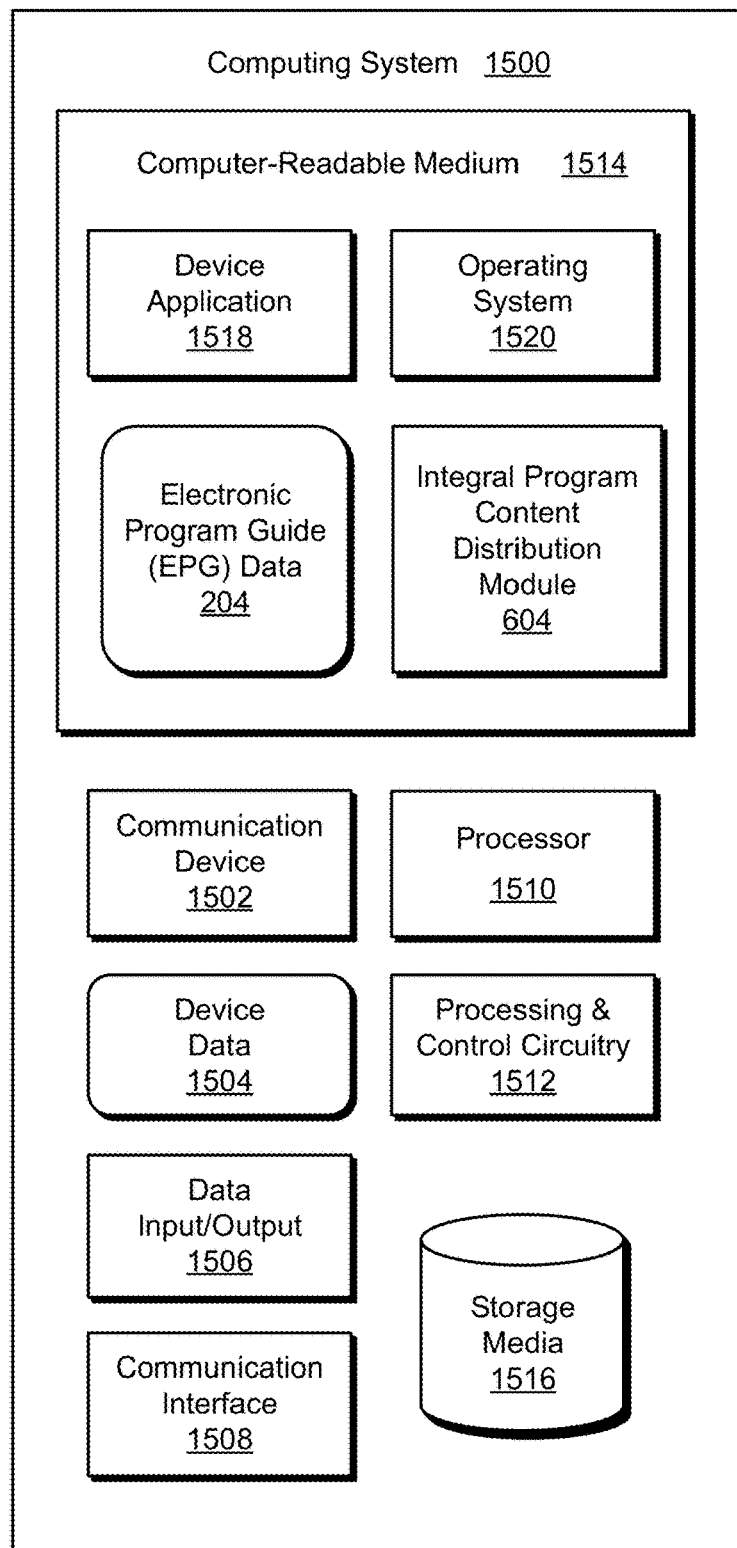
FIG. 15 illustrates an example computing system embodying, or in which techniques may be implemented that enable use of, integral program content distribution.

FIG. 15 illustrates various components of example computing system 1500 that can be implemented as any type of client, server, or other computing device as described with reference to the previous FIGS. 1-14 to implement integral program content distribution.

Computing system 1500 includes one or more communication devices 1502 that enable wired and/or wireless communication of device data 1504 (e.g., received data, data that is being received, data scheduled for broadcast, and packets of the data). Device data 1504 or other device content can include configuration settings of the device, media content stored on the device, and/or information associated with a remote end user (e.g., account information for a television or DVR subscriber). Media content stored on computing system 1500 can include any type of audio, video, and/or image data. Computing system 1500 includes one or more data inputs and/or outputs (I/O) 1506 via which any type of data, media content, and/or inputs can be received (e.g., program content requests 206 or data from a content information source 804), or media can be output, such as television media content, recorded video content, and any other type of audio, video, and/or image data received from any content and/or data source.

Computing system 1500 also includes one or more communication interfaces 1508, which can be implemented as any one or more of a serial and/or parallel interface, a wireless interface, any type of network interface, a modem, and as any other type of communication interface. Communication interfaces 1508 provide a connection and/or communication link between computing system 1500 and a communication network by which other electronic, computing, and communication devices communicate data with computing system 1500.

Computing system 1500 includes one or more processors 1510 (e.g., any of microprocessors, controllers, and the like), which process various computer-executable instructions to control the operation of computing system 1500 and to enable techniques for, or in which can be embodied, integral program content distribution. Alternatively or additionally, computing system 1500 can be implemented with any one or combination of hardware, firmware, or fixed logic circuitry that is implemented in connection with processing and control circuitry 1512. Although not shown, computing system 1500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1500 also includes one or more computer-readable media 1514, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 1500 can also include a mass storage media device or storage media 1516, which may be separate from or part of the computer-readable medium 1514 and can store data for content information source 804 of FIG. 8.

Computer-readable media 1514 provides data storage mechanisms to store device data 1504, as well as various device applications 1518 and any other types of information and/or data related to operational aspects of computing system 1500. For example, an operating system 1520 can be maintained as a computer application with computer-readable media 1514 and executed on processors 1510. Device applications 1518 may include a device manager, such as any form of a control application, software application, signal-processing and control module, code that is native to a particular device, a hardware abstraction layer for a particular device, and so on. Device applications 1518 can also include system components, engines, or managers to implement a DVR system 202 of FIG. 2 that is part of a media program distribution system. The computer-readable medium 1514 can also contain EPG data 204 and instructions for an integral program content distribution module 604, which can be executed by the processors 1510 as described herein.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description.

Although techniques using, and apparatuses including, integral program content distribution have been described in language specific to features and/or methods, it is to be understood that the subject matter of the appended claims is not necessarily limited to the specific features or methods described. Rather, the specific features and methods are disclosed as example implementations of integral program content distribution.

What is claimed is:

1. A computer-implemented method comprising:
receiving, at a cloud-based digital video recorder (DVR) system and from an end-user device, a request to record program content excerpted from a continuous media stream, the request including a program content indicator for the program content;
accessing, by the cloud-based DVR system, electronic program guide (EPG) data based on the program content indicator to ascertain a scheduled broadcast time related to the program content;
using the scheduled broadcast time as a starting point to search along the continuous media stream including the program content for indications of an apparent broadcast time;
applying different weights to different subsets of the indications including first and second subsets, each of the first and second subsets including mutually-supporting indications, at least one indication in the first subset conflicting with at least one additional indication in the second subset; and
determining, by the cloud-based DVR system, the apparent broadcast time for the program content based on the applied different weights of the different subsets of the indications, the apparent broadcast time for the program content including an apparent broadcast start-time and an apparent broadcast end-time;
initiating, by the cloud-based DVR system, transmission of the program content to the end-user device responsive to the apparent broadcast start-time, the program content extracted from the continuous media stream responsive to the apparent broadcast time; and
terminating, by the cloud-based DVR system, the transmission of the program content to the end-user device responsive to the apparent broadcast end-time.

2. The computer-implemented method as described in claim 1, wherein:
the request comprises a selection of a media program indicated to an end user via an EPG display;
the receiving comprises receiving the selection of the media program;
the method further comprises accessing a portion of the continuous media stream, which contains the media program; and
the determining comprises comparing the portion of the continuous media stream to data obtained from a content information source.

3. The computer-implemented method as described in claim 2, wherein:
the portion of the continuous media stream comprises a video stream; and
the data obtained from the content information source comprises an image of an entity present in another media program that is adjacent to the media program along the continuous media stream.

4. The computer-implemented method as described in claim 2, wherein:
the portion of the continuous media stream comprises at least one of an audio stream or a closed captioning (CC) stream; and
the data obtained from the content information source comprises multiple words or phrases indicative of a program content transition.

5. The computer-implemented method as described in claim 1, wherein the initiating comprises:
extracting the program content from the continuous media stream with the program content corresponding to an initiating time or a terminating time that is based on the apparent broadcast start-time or the apparent broadcast end-time, respectively; and
transmitting, to the end-user device, a media stream including the program content.

6. The computer-implemented method as described in claim 1, wherein the determining further comprises determining the apparent broadcast time based on a content information source comprising at least one of a social media communication or a webpage.

7. The computer-implemented method as described in claim 1, wherein the program content indicator comprises an entity, and the program content comprises an excerpt of a media program.

8. The computer-implemented method as described in claim 7, wherein the entity comprises at least one of a person or an event.

9. The computer-implemented method as described in claim 7, wherein the accessing comprises accessing the EPG data based on the program content indicator to further ascertain descriptive data related to the program content, and wherein the descriptive data related to the program content includes the entity.

10. The computer-implemented method as described in claim 7, wherein:
the excerpt of the media program has a temporal location corresponding to the apparent broadcast start-time and the apparent broadcast end-time;
the accessing comprises accessing the EPG data based on the program content indicator to further ascertain descriptive data related to the program content;
the scheduled broadcast time comprises a scheduled broadcast start time of the media program, and the descriptive data further includes a scheduled broadcast end time of the media program;
the media program has a temporal location corresponding to the scheduled broadcast start time and the scheduled broadcast end time; and
the apparent broadcast start-time and the apparent broadcast end-time are located between the scheduled broadcast start time and the scheduled broadcast end time.

11. The computer-implemented method as described in claim 10, wherein:
the continuous media stream includes the media program; and
the determining comprises:
comparing a portion of the continuous media stream to data obtained from a content information source;
recognizing the entity in the portion of the continuous media stream based on the comparing; and
determining the temporal location of the excerpt within the media program based on the recognizing.

12. A computing system including:
at least one processor;
a cloud-based digital video recorder (DVR) module implemented at least partially in hardware; and
computer-readable storage media having computer-executable instructions stored thereon that, responsive to execution by the at least one processor, cause the cloud-based digital video recorder (DVR) module to perform operations comprising:
analyzing a media stream including multiple media programs arranged sequentially along the media stream;
searching the media stream for indications providing evidence of a media program transition between two consecutive media programs of the multiple media programs;
applying different weights to different subsets of the indications including first and second subsets, each of the first and second subsets including multiple mutually-supporting indications, at least one indication in the first subset conflicting with at least one additional indication in the second subset;
determining an apparent broadcast start-time along the media stream of a subsequent media program of the two consecutive media programs based on the applied different weights of the different subsets of the indications;
determining an apparent broadcast end-time along the media stream of the subsequent media program based on an additional search of the media stream for additional evidence of another media program transition after the subsequent media program;
storing boundary indicators in association with the media stream based on the apparent broadcast start-time and the apparent broadcast end-time; and
transmitting to an end-user device the subsequent media program of the two consecutive media programs based on the boundary indicators.

13. The computing system as described in claim 12, wherein:
the evidence of the media program transition comprises media content;
the operations further comprise obtaining from a content information source a content sample indicative of a media program transition; and
the determining an apparent broadcast start-time comprises:
comparing the media content to the content sample; and
based on the comparing, ascertaining a content match indicative of the apparent broadcast start-time.

14. The computing system as described in claim 13, wherein:
the media content comprises a video stream having multiple images;
the obtaining comprises:
accessing electronic program guide (EPG) data to identify a particular media program of the two consecutive media programs;
determining an entity present in the particular media program; and
retrieving an image for the entity, the image for the entity comprising the content sample; and
the comparing comprises comparing the multiple images of the video stream to the image for the entity.

15. The computing system as described in claim 12, wherein:
the evidence of the media program transition comprises first media content and second media content; and
the determining an apparent broadcast start-time comprises:
comparing the first media content to the second media content; and
based on the comparing, ascertaining a content difference indicative of the apparent broadcast start-time.

16. The computing system as described in claim 15, wherein the first media content comprises a portion of a video image having a constant appearance over a first time period, and the second media content comprises the portion of the video image having a changing appearance over a second time period.

17. A cloud-based digital video recorder (DVR) system comprising:
a processor configured to implement multiple modules, the multiple modules configured to perform cloud-based operations; and
a memory comprising:
a digital video recorder (DVR) module configured to store a respective continuous media stream for each respective channel of multiple channels;

electronic program guide (EPG) data configured to be organized in accordance with the multiple channels across multiple timeslots, the EPG data including respective entries corresponding to respective media programs that map to a channel of the multiple channels and a timeslot of the multiple timeslots, each respective entry associating a scheduled broadcast time with the corresponding respective media program;

an end-user interaction module configured to accept from an end-user device a request to record program content, the request including a program content indicator for the program content;

an EPG access module configured to access the EPG data based on the program content indicator to ascertain a channel and a scheduled broadcast time corresponding to the program content;

a program content location module configured to:
use the scheduled broadcast time as a starting point to search along the continuous media stream for the ascertained channel for indications of an apparent broadcast time for the program content; and determine the apparent broadcast time for the program content based on different weights applied to different subsets of the indications, the apparent broadcast time differing from the scheduled broadcast time, the apparent broadcast time including an apparent broadcast start-time and an apparent broadcast end-time;

an integral program content distribution module configured to process the indications with the different weights applied to the different subsets of the indications, each subset including mutually-supporting indications, at least one indication in a first subset of the indications conflicting with at least one additional indication in a second subset of the indications; and a program content transmission module configured to initiate transmission of the program content to the end-user device responsive to the apparent broadcast start-time and terminate the transmission of the program content responsive to the apparent broadcast end-time.

18. The cloud-based digital video recorder (DVR) system of claim 17, wherein:
the program content comprises a media program having a delayed actual broadcast time; and
the apparent broadcast time corresponds to a temporal location that is closer to the delayed actual broadcast time than to the scheduled broadcast time.

19. The cloud-based digital video recorder (DVR) system of claim 17, wherein:
the scheduled broadcast time comprises a scheduled broadcast start time and a scheduled broadcast end time;
the program content comprises an excerpt of a media program, a length of the excerpt being shorter than a length of the media program; and
the apparent broadcast start-time and the apparent broadcast end-time are both located between the scheduled broadcast start time and the scheduled broadcast end time.

20. The cloud-based digital video recorder (DVR) system of claim 17, wherein the program content location module comprises an EPG remediation module configured to compute the apparent broadcast time of the program content to adjust program content transmission if the scheduled broadcast time fails to align with the temporal location of the program content.

\* \* \* \* \*